US007382342B2

(12) United States Patent
Uchino et al.

(10) Patent No.: US 7,382,342 B2

(45) Date of Patent: Jun. 3, 2008

(54) PIXEL CIRCUIT AND DISPLAY DEVICE

(75) Inventors: Katsuhide Uchino, Kanagawa (JP); Junichi Yamashita, Tokyo (JP); Tetsuro Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 583 days.

(21) Appl. No.: 10/857,857

(22) Filed: Jun. 2, 2004

(65) Prior Publication Data

US 2005/0012736 A1 Jan. 20, 2005

(30) Foreign Application Priority Data

Jun. 3, 2003 (JP) ............................ 2003-158423

(51) Int. Cl.
*G09G 3/36* (2006.01)
*G02F 1/1345* (2006.01)

(52) U.S. Cl. ........................... 345/92; 345/76; 345/82; 345/211; 349/149; 349/151; 349/152; 315/169.3

(58) Field of Classification Search .................. 345/76, 345/80, 82, 92–100, 205, 211; 315/169.3; 349/149, 151, 162

See application file for complete search history.

(56) References Cited

U.S. PATENT DOCUMENTS 6,859,193 B1 * 2/2005 Yumoto ...................... 345/82
7,230,592 B2 * 6/2007 Sato et al. .................... 345/76
7,236,149 B2 * 6/2007 Yamashita et al. ............ 345/76
2005/0156829 A1 * 7/2005 Choi et al. .................... 345/76

FOREIGN PATENT DOCUMENTS

| | | |
|---|---|---|
| EP | 1 310 937 A1 | 5/2003 |
| JP | 10-039326 | 2/1998 |
| JP | 11-024104 | 1/1999 |
| JP | 11-218782 | 8/1999 |
| JP | 2001-144301 | 5/2001 |
| JP | 2002-149112 | 5/2002 |
| JP | 2003-059660 | 2/2003 |
| JP | 2003-150108 | 5/2003 |
| JP | 2003-173154 | 6/2003 |

* cited by examiner

*Primary Examiner*—Henry N Tran
(74) *Attorney, Agent, or Firm*—Oblon, Spivak, McClelland, Maier & Neustadt, P.C.

(57) ABSTRACT

A pixel circuit able to prevent a spread of the terminal voltages of drive transistors inside a panel and in turn able to reliably prevent deterioration of uniformity, wherein a source of a TFT serving as a drive transistor is connected to an anode of a light emitting element, a drain is connected to a power source potential, a capacitor is connected between a gate and source of the TFT, and a source potential of the TFT is connected to a fixed potential through a TFT serving as a switch transistor and wherein pixel circuit lines are connected by an upper line and bottom line and are arranged in parallel with pixel circuit power source voltage lines so as not to have intersecting parts.

8 Claims, 18 Drawing Sheets

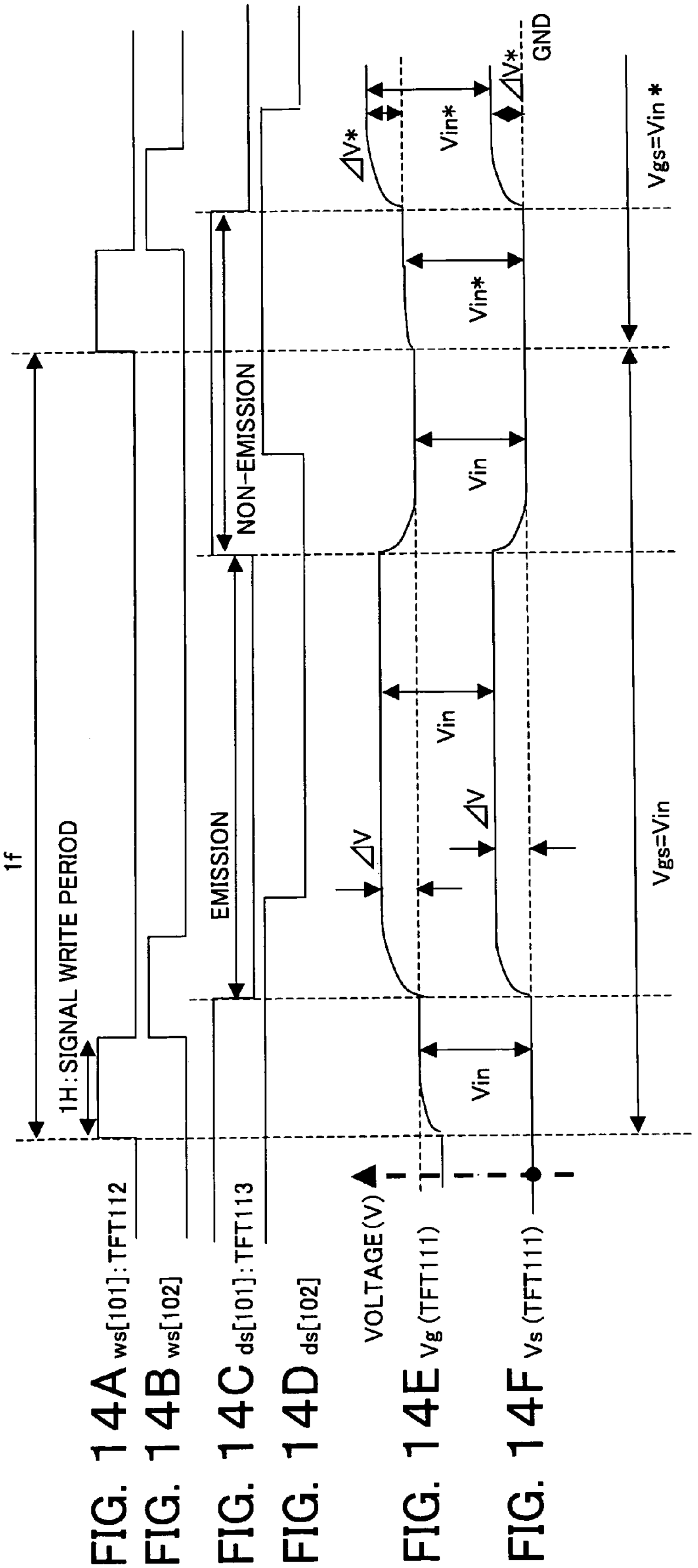
FIG. 14A ws[101]: TFT112
FIG. 14B ws[102]
FIG. 14C ds[101]: TFT113
FIG. 14D ds[102]
FIG. 14E Vg (TFT111)
FIG. 14F Vs (TFT111)

PIXEL CIRCUIT AND DISPLAY DEVICE

BACKGROUND OF THE INVENTION

1. Field of the Invention

The present invention relates to a pixel circuit having an organic electroluminescence (EL) element or other electro-optic element with a luminance controlled by a current value and an image display device comprised of such pixel circuits arrayed in a matrix, in particular a so-called active matrix type image display device controlled in value of current flowing through the electro-optic elements by insulating gate type field effect transistors (FETs) provided inside the pixel circuits.

2. Description of the Related Art

In an image display device, for example, a liquid crystal display, a large number of pixels are arranged in a matrix and the light intensity is controlled for every pixel in accordance with the image information to be displayed so as to display an image. This same is true for an organic EL display etc. An organic EL display is a so-called self light emitting type display having a light emitting element in each pixel circuit and has the advantages that the viewability of the image is higher in comparison with a liquid crystal display, a back-light is unnecessary, the response speed is high, etc. Further, it greatly differs from a liquid crystal display etc. in the point that the gradations of the color generation are obtained by controlling the luminance of each light emitting element by the value of the current flowing through it, that is, each light emitting element is a current controlled type.

An organic EL display, in the same way as a liquid crystal display, may be driven by a simple matrix and an active matrix system, but while the former has a simple structure, it has the problem that realization of a large sized and high definition display is difficult. For this reason, much effort is being devoted to development of the active matrix system of controlling the current flowing through the light emitting element inside each pixel circuit by an active element provided inside the pixel circuit, generally, a thin film transistor (TFT).

FIG. 1 is a block diagram of the configuration of a general organic EL display device. This display device 1 has, as shown in FIG. 1, a pixel array portion 2 comprised of pixel circuits (PXLC) 2*a* arranged in an m×n matrix, a horizontal selector (HSEL) 3, a write scanner (WSCN) 4, data lines DTL1 to DTLn selected by the horizontal selector 3 and supplied with a data signal in accordance with the luminance information, and scanning lines WSL1 to WSLm selectively driven by the write scanner 4. Note that relative to the write scanner 4, the horizontal selector 3 is sometimes formed on polycrystalline silicon and sometimes formed around the pixels by MOSIC etc.

FIG. 2 is a circuit diagram of an example of the configuration of a pixel circuit 2*a* of FIG. 1 (refer to for example U.S. Pat. No. 5,684,365 and Japanese Unexamined Patent Publication (Kokai) No. 8-234683). The pixel circuit of FIG. 2 has the simplest circuit configuration among the large number of proposed circuits and is a so-called two-transistor drive type circuit.

The pixel circuit 2*a* of FIG. 2 has a p-channel thin film FET (hereinafter, referred to as TFT) 11 and TFT 12, a capacitor C11, and organic EL element (OLED) 13 as the light emitting element. Further, in FIG. 2, DTL indicates a data line, and WSL indicates a scanning line. An organic EL element has a rectification property in many cases, so sometimes is referred to as an organic light emitting diode (OLED). The symbol of a diode is used as the light emitting element in FIG. 2 and the other figures, but a rectification property is not always required for an organic EL element in the following explanation. In FIG. 2, a source of the TFT 11 is connected to a power supply potential VCC, and a cathode of the light emitting element 13 is connected to a ground potential GND. The operation of the pixel circuit 2*a* of FIG. 2 is as follows.

Step ST1

When the scanning line WSL is made a selected state (low level here) and a write potential Vdata is supplied to the data line DTL, the TFT 12 becomes conductive, the capacitor C11 is charged or discharged, and the gate potential of the TFT 11 becomes Vdata.

Step ST2

When the scanning line WSL is made a non-selected state (high level here), the data line DTL and the TFT 11 are electrically separated, but the gate potential of the TFT 11 is held stably by the capacitor C11.

Step ST3

The current flowing through the TFT 11 and the light emitting element 13 becomes a value in accordance with a gate-source voltage Vgs of the TFT 11, while the light emitting element 13 is continuously emitting light with a luminance in accordance with the current value. As in the above step ST1, the operation of selecting the scanning line WSL and transmitting the luminance information given to the data line to the inside of a pixel will be referred to as "writing" below. As explained above, in the pixel circuit 2*a* of FIG. 2, if once the Vdata is written, the light emitting element 13 continues to emit light with a constant luminance in the period up to the next rewrite operation.

As explained above, in the pixel circuit 2*a*, by changing a gate application voltage of the drive transistor constituted by the TFT 11, the value of the current flowing through the EL light emitting element 13 is controlled. At this time, the source of the p-channel drive transistor is connected to the power supply potential Vcc, so this TFT 11 is always operating in a saturated region. Accordingly, it becomes a constant current source having a value shown in the following equation 1.

$$Ids=1/2\cdot\mu(W/L)Cox(Vgs-|Vth|)^2 \quad (1)$$

Here, μ indicates the mobility of a carrier, Cox indicates a gate capacitance per unit area, W indicates a gate width, L indicates a gate length, Vgs indicates the gate-source voltage of the TFT 11, and Vth indicates the threshold value of the TFT 11.

In a simple matrix type image display device, each light emitting element emits light only at a selected instant, while in an active matrix, as explained above, each light emitting element continues emitting light even after the end of the write operation. Therefore, it becomes advantageous in especially a large sized and high definition display in the point that the peak luminance and peak current of each light emitting element can be lowered in comparison with a simple matrix.

FIG. 3 is a view of the change along with time of the current-voltage (I-V) characteristic of an organic EL emitting element. In FIG. 3, the curve shown by the solid line indicates the characteristic in the initial state, while the curve shown by the broken line indicates the characteristic after change along with time.

In general, the I-V characteristic of an organic EL emitting element ends up deteriorating along with time as shown in FIG. 3. However, since the two-transistor drive system of FIG. 2 is a constant current drive system, a constant current is continuously supplied to the organic EL emitting element as explained above. Even if the I-V characteristic of the organic EL emitting element deteriorates, the luminance of the emitted light will not change along with time.

The pixel circuit 2*a* of FIG. 2 is comprised of p-channel TFTs, but if it were possible to configure it by n-channel TFTs, it would be possible to use an amorphous silicon (a-Si) process of the related art in the fabrication of the TFTs. This would enable a reduction in the cost of TFT substrates.

Next, consider a pixel device replacing the transistors with n-channel TFTs.

FIG. 4 is a circuit diagram of a pixel circuit replacing the p-channel TFTs of the circuit of FIG. 2 with n-channel TFTs.

The pixel circuit 2*b* of FIG. 4 has an n-channel TFT 21 and TFT 22, a capacitor C21, and a light emitting element 23 constituted by an organic EL element (OLED). Further, in FIG. 4, DTL indicates a data line, and WSL indicates a scanning line.

In the pixel circuit 2*b*, the drain side of the TFT 21 serving as the drive transistor is connected to the power source potential Vcc, and the source is connected to the anode of the organic EL emitting element 23, whereby a source-follower circuit is formed.

FIG. 5 is a view of the operating point of a TFT 21 serving as the drive transistor and an organic EL emitting element 23 in the initial state. In FIG. 5, the abscissa indicates the drain-source voltage Vds of the TFT 21, while the ordinate indicates the drain-source current Ids.

As shown in FIG. 5, the source voltage is determined by the operating point of the drive transistor constituted by the TFT 21 and the organic EL emitting element 23. The voltage differs in value depending on the gate voltage. This TFT 21 is driven in the saturated region, so a current Ids of the value of the above equation 1 is supplied for the Vgs for the source voltage of the operating point.

Summarizing the problems to be solved by the invention, here too, the I-V characteristic of the organic EL emitting element ends up deteriorating along with time. As shown in FIG. 6, the operating point ends up fluctuating due to this change. The source voltage fluctuates even if supplying the same gate voltage. Due to this, the gate-source voltage Vgs of the drive transistor constituted by the TFT 21 ends up changing and the value of the current flowing fluctuates. The value of the current flowing through the organic EL emitting element 23 simultaneously changes, so if the I-V characteristic of the organic EL emitting element 23 deteriorates, the luminance of the emitted light will end up changing along with time in the source-follower circuit of FIG. 4.

Further, as shown in FIG. 7, a circuit configuration where the source of the n-channel TFT 31 serving as the drive transistor is connected to the ground potential GND, the drain is connected to the cathode of the organic EL diode 33, and the anode of the organic EL emitting element 33 is connected to the power source potential Vcc may be considered.

With this system, in the same way as when driven by the p-channel TFT of FIG. 2, the potential of the source is fixed, the TFT 31 serving as the drive transistor operates as a constant current source, and a change in the luminance due to deterioration of the I-V characteristic of the organic EL element can be prevented.

With this system, however, the drive transistor has to be connected to the cathode side of the organic EL diode. This cathodic connection requires development of new anode-cathode electrodes. This is considered extremely difficult with the current level of technology.

Therefore, as shown in FIG. 8, in the pixel circuit 51, the source of the TFT 41 serving as the drive transistor is connected to the anode of the light emitting element 44, the drain is connected to the power source potential Vcc, a capacitor C41 is connected between the gate and source of the TFT 41, and the source potential of the TFT 41 is connected to a fixed potential through the TFT 43 serving as a switch transistor, whereby source-follower output with no deterioration in luminance even with a change in the I-V characteristic of the organic EL emitting element along with time becomes possible. Further, a source-follower circuit of n-channel transistors becomes possible, so it is possible to use an n-channel transistor as a drive element of an organic EL emitting element while using current anode-cathode electrodes. Further, it is possible to configure transistors of a pixel circuit by only n-channel transistors and possible to use the a-Si process in the fabrication of the TFTs. Due to this, there is the advantage that a reduction of the cost of TFT substrates becomes possible.

In the display device shown in FIG. 8, 51 indicates a pixel circuit, 52 a pixel array portion, 53 a horizontal selector (HSEL), 54 a write scanner (WSCN), 55 a drive scanner (DSCN), DTL51 a data line selected by the horizontal scanner 53 and supplied with a data signal in accordance with the luminance information, WSL51 a scanning line selectively driven by the write scanner 54, and DSL51 a drive line selectively driven by the drive scanner 55.

As shown by the pixel circuit of FIG. 8, to correct the deterioration over time of the I-V characteristic of the organic EL emitting element 44, a Vss (reference power source) line VSL is laid to each pixel and a video signal is written based on that. In general, in an EL display device, as shown in FIG. 9, power source voltage Vcc lines VCL for the pixel circuit are input from a pad 61 above the panel including the pixel array portion 52. These interconnects are laid in the vertical direction with respect to the panel. On the other hand, the Vss lines VSL are taken out at the cathode Vss pads 62 and 63 from the left and right of the panel. In the past, contacts were taken from the cathode Vss lines, and the Vss lines for the pixel circuits were laid out in parallel in the horizontal direction at the panel.

However, this method of the related art had problems. Each Vss line had (number of pixels in the X-direction× RGB) number of pixels connected to it. Therefore, when the TFT 43 of FIG. 8 was on, that number of pixels' worth of current flowed through it and therefore a fluctuation like a distribution constant ended up on the interconnect. When this fluctuation entered the ground line during the signal sampling period, the gate-source voltage Vgs of the drive transistor constituted by the TFT 41 ended up with a spread in the panel and as a result the uniformity ended up deteriorating.

SUMMARY OF THE INVENTION

A first object of the present invention is to provide a pixel circuit able to prevent a spread of the terminal voltages of drive transistors inside a panel and in turn able to reliably prevent deterioration of uniformity and a display device for the same.

A second object of the present invention is to provide a pixel circuit able to reliably prevent deterioration of the uniformity, enabling source-follower output with no deterioration of luminance even with a change of the current-voltage characteristic of the light emitting element along with time, enabling a source-follower circuit of n-channel transistors, and able to use an n-channel transistor as an EL drive transistor while using current anode-cathode electrodes and a display device for the same.

To attain the above object, according to a first aspect of the present invention, there is provided a pixel circuit for driving an electro-optic element with a luminance changing according to a flowing current, comprising a drive transistor forming a current supply line between a first terminal and a second terminal and controlling a current flowing through the current supply line in accordance with the potential of a control terminal; a first node; a power source voltage source; a reference power source interconnect; and a first circuit for connecting the first node to the reference power source interconnect for making a potential of the first node change to a fixed potential while the electro-optic element is not emitting light; the current supply line of the drive transistor, the first node, and the electro-optic element being connected in series between the power source voltage source and reference potential; the power source voltage source interconnect and the reference power source interconnect being laid out in the same direction so as not to have intersecting parts.

Preferably, the circuit further comprises a data line through which a data signal in accordance with luminance information is supplied; a second node; a first control line; a pixel capacitance element connected between the first node and the second node; and a first switch between the data line and the second node and controlled in conduction by the first control line.

More preferably, the circuit further comprises a second control line; the drive transistor is a field effect transistor with a source connected to the first node, a drain connected to the power source voltage source interconnect or reference potential, and a gate connected to the second node; and the first circuit includes a second switch connected between the first node and fixed potential and controlled in conduction by the second control line.

Still more preferably, when the electro-optic element is driven, as a first stage, the first switch is held in a non-conductive state by the first control line and, in that state, the second switch is held in a conductive state and the first node is connected to a fixed potential by the second control line; as a second stage, the first switch is held in a conductive state by the first control line, data to be propagated over the data line is written in the pixel capacitance element, then the first switch is held in a non-conductive state; and as a third stage, the second switch is held in a non-conductive state by the second control line.

Alternatively, preferably, the circuit further comprises a second and third control line; the drive transistor is a field effect transistor with a drain connected to the power source voltage source or reference potential and a gate connected to the second node; and the first circuit includes a second switch connected between a source of the field effect transistor and the electro-optic element and controlled in conduction by the second control line and a third switch connected between the first node and the reference power source interconnect and controlled in conduction by the third control line.

More preferably, when the electro-optic element is driven, as a first stage, the first switch is held in a non-conductive state by the first control line, the second switch is held in a non-conductive state by the second control line, and the third switch is held in a non-conductive state by the third control line; as a second stage, the first switch is held in a conductive state by the first control line, the third switch is held in a conductive state by the third control line, the first node is held at a predetermined potential, and, in that state, data to be propagated over the data line is written in the pixel capacitance element, then the first switch is held in a non-conductive state by the first control line; and as a third stage, the third switch is held in a non-conductive state by the third control line and the second switch is held in a conductive state by the second control line.

According to a second aspect of the invention, there is provided a display device comprising a plurality of pixel circuits arranged in a matrix; power source voltage source interconnects arranged for the matrix array of pixel circuits; reference power source interconnects arranged for the matrix array of pixel circuits; and a reference potential; each pixel circuit including an electro-optic element with a luminance changing according to a flowing current, a drive transistor forming a current supply line between a first terminal and a second terminal and controlling a current flowing through the current supply line in accordance with the potential of a control terminal, a first node, and a first circuit for connecting the first node to the corresponding reference power source interconnect for making a potential of the first node change to a fixed potential while the electro-optic element is not emitting light, the current supply line of the drive transistor, the first node, and the electro-optic element being connected in series between the power source voltage source and reference potential, and the power source voltage source interconnect and the reference power source interconnect being laid out in the same direction so as not to have intersecting parts.

Preferably, the display device further comprises a data line arranged for each column of the matrix array of pixel circuits and through which a data signal in accordance with luminance information is supplied and a first control line arranged for each row of the matrix array of pixel circuits; each pixel circuit further having a second node, a pixel capacitance element connected between the first node and the second node and a first switch connected between the corresponding data line and the second node and controlled in conduction by the corresponding first control line.

More preferably, the device further comprises second control lines; each drive transistor is a field effect transistor with a source connected to the first node, a drain connected to the corresponding power source voltage source interconnect or reference potential, and a gate connected to the second node; and the first circuit includes a second switch connected between the first node and fixed potential and controlled in conduction by the corresponding second control line.

Still more preferably, when an electro-optic element is driven, as a first stage, the first switch is held in a non-conductive state by the corresponding first control line and, in that state, the second switch is held in a conductive state and the first node is connected to a fixed potential by the corresponding second control line; as a second stage, the first switch is held in a conductive state by the corresponding first control line, data to be propagated over the data line is written in the pixel capacitance element, then the first switch is held in a non-conductive state; and as a third stage, the second switch is held in a non-conductive state by the corresponding second control line.

Alternatively, preferably the device further comprises second and third control lines; each drive transistor is a field effect transistor with a drain connected to the power source voltage source interconnect or reference potential and a gate connected to the second node; and the first circuit includes a second switch connected between a source of the field effect transistor and the electro-optic element and controlled in conduction by the corresponding second control line and a third switch connected between the first node and the reference power source interconnect and controlled in conduction by the corresponding third control line.

More preferably, when an electro-optic element is driven, as a first stage, the first switch is held in a non-conductive state by the corresponding first control line, the second switch is held in a non-conductive state by the corresponding second control line, and the third switch is held in a non-conductive state by the corresponding third control line; as a second stage, the first switch is held in a conductive state by the corresponding first control line, the third switch is held in a conductive state by the corresponding third control line, the first node is held at a predetermined potential, and, in that state, data to be propagated over the data line is written in the pixel capacitance element, then the first switch is held in a non-conductive state by the corresponding first control line; and as a third stage, the third switch is held in a non-conductive state by the corresponding third control line and the second switch is held in a conductive state by the corresponding second control line.

According to the present invention, since the power source voltage source interconnects and the reference power source interconnects are laid out in the same direction so as not to have any intersecting parts, it is possible to prevent overlap between the power source voltage source interconnects and the reference power source interconnects. Accordingly, it is possible to lay out the reference power source interconnects (Vss interconnects) by a lower resistance than the past. Further, the number of pixels connected to a single interconnect is smaller in the vertical direction (y-direction) than the horizontal direction (x-direction) at a general angle of view, so with the same line width, it is possible to lay out the reference power source interconnects by a lower resistance than the past.

According to the present invention, further, since the source electrode of a drive transistor is connected to a fixed potential through a switch and there is a pixel capacity between the gate and source of the drive transistor, the change in luminance due to the change in the I-V characteristic of a light emitting element along with time is corrected. When the drive transistor is an n-channel transistor, by making the fixed potential a ground potential, the potential applied to the light emitting element is made the ground potential so as to create a non-emitting period of the light emitting element. Further, by adjusting the off period of the second switch connecting the source electrode and ground potential, the emitting and non-emitting periods of the light emitting element are adjusted for duty driving. Further, by making the fixed potential close to the ground potential or a potential lower than that or by raising the gate voltage, deterioration of the image quality due to fluctuation in the threshold voltage Vth of the switch transistor connected to the fixed potential is suppressed. Further, when the drive transistor is a p-channel transistor, by making the fixed potential the potential of the power source connected to the cathode electrode of the light emitting element, the potential applied to the light emitting element is made the power source potential so as to create a non-emitting period of the organic EL element. Further, by making the characteristic of the drive transistor an n-channel type, a source-follower circuit becomes and anodic connection becomes possible. Further, making all of the drive transistors n-channel transistors becomes possible, introduction of a general amorphous silicon process becomes possible, and reduction of the cost becomes possible.

Further, since the second switch is laid out between the light emitting element and the drive transistor, current is not supplied to the drive transistor in the non-emitting period and therefore power consumption of the panel is suppressed. Further, by using a potential of the cathode side of the light emitting element as the ground potential, for example, the second reference potential, there is no need to provide a GND interconnect at the TFT side inside the panel. Further, by being able to delete the GND interconnects of the TFT substrates in the panel, layout in the pixels and layout of the peripheral circuits become easy. Further, by being able to delete the GND interconnects of the TFT substrates in the panel, there is no overlap between the power source potential (first reference potential) and ground potential (second reference potential) of the peripheral circuits, the Vcc lines can be laid out with a lower resistance, and a high uniformity can be achieved.

Further, by turning the third switch at the power source interconnect side on when writing in a signal line so as to lower the impedance, the coupling effect on pixel writing is corrected in a short time and an image of a high uniformity is obtained.

BRIEF DESCRIPTION OF THE DRAWINGS

These and other objects and features of the present invention will become clearer from the following description of the preferred embodiments given with reference to the accompanying drawings, in which:

FIGS. 14A to 14F are timing charts for explaining the operation of the circuit of FIG. 11;

DESCRIPTION OF THE PREFERRED EMBODIMENTS

Below, preferred embodiments of the present invention will be described with reference to the accompanying drawings.

First Embodiment

Figure 1:
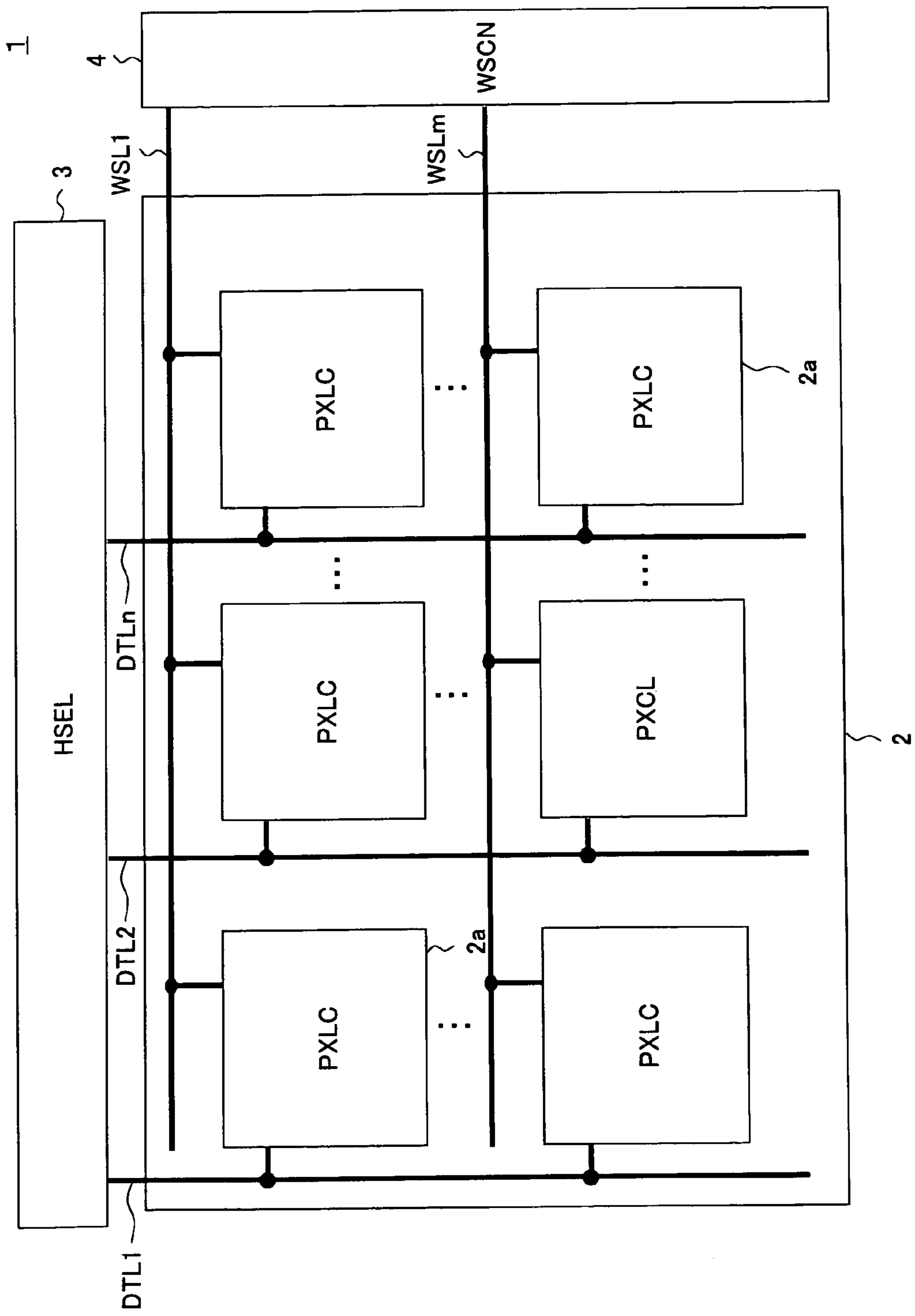
FIG. 1 is a block diagram of the configuration of a general organic EL display device.
Figure 2:
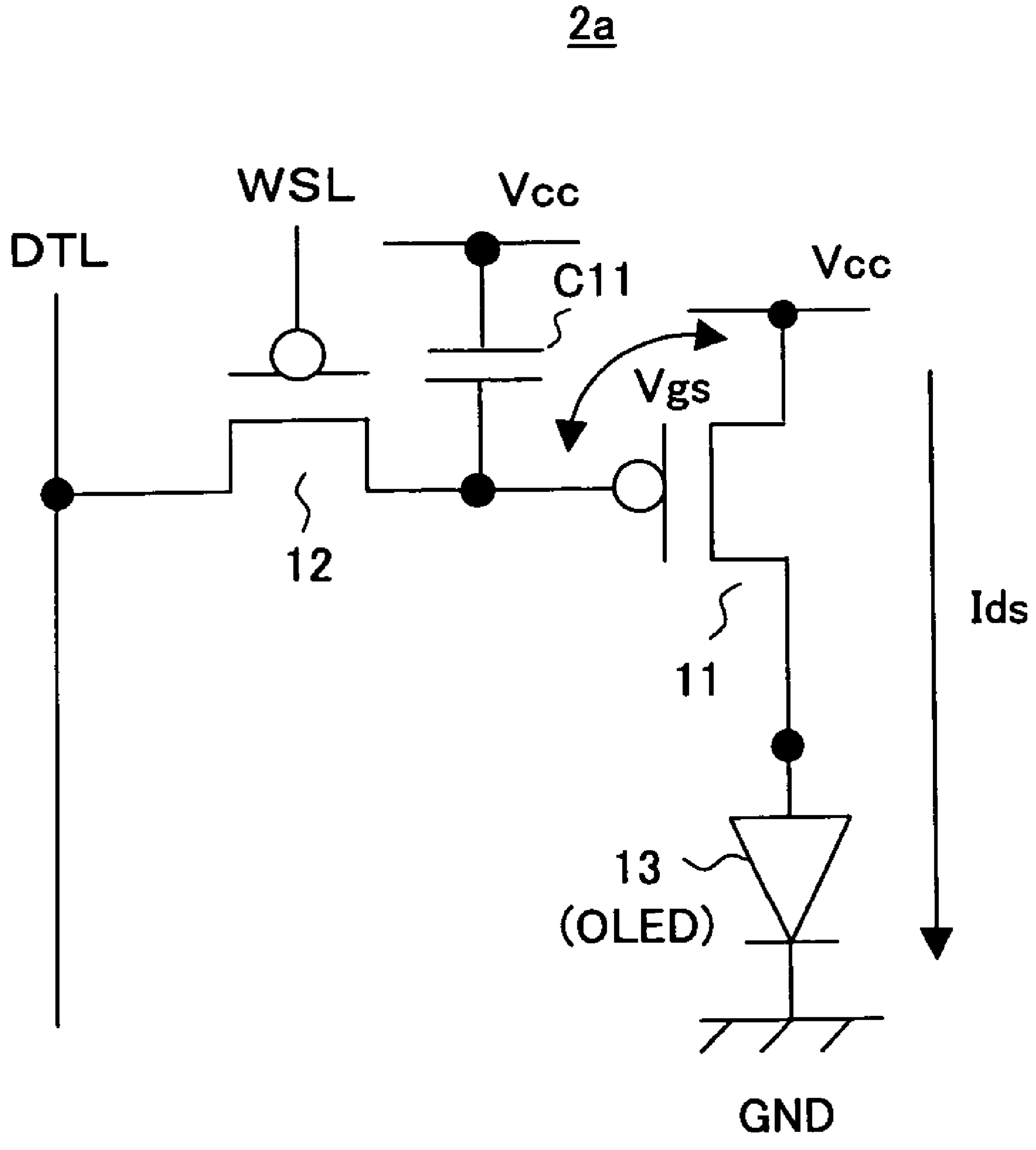
FIG. 2 is a circuit diagram of an example of the configuration of a pixel circuit of FIG. 1.
Figure 3:
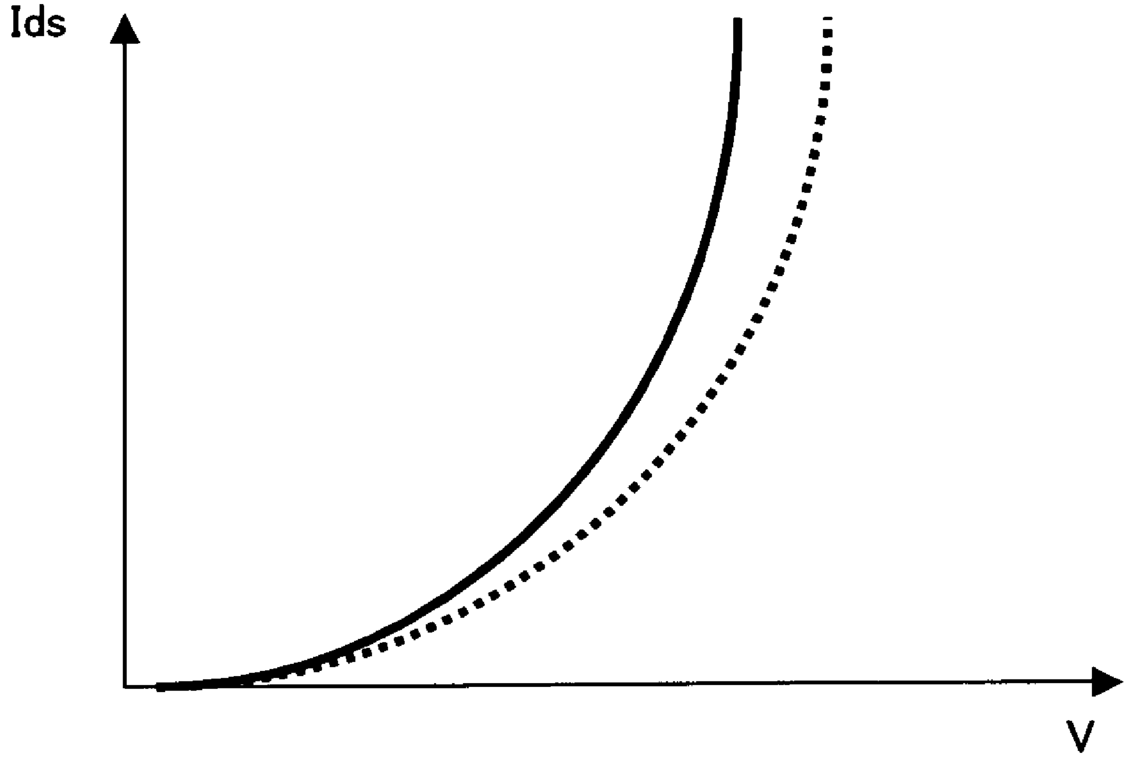
FIG. 3 is a graph of the change along with time of the current-voltage (I-V) characteristic of an organic EL device.
Figure 4:
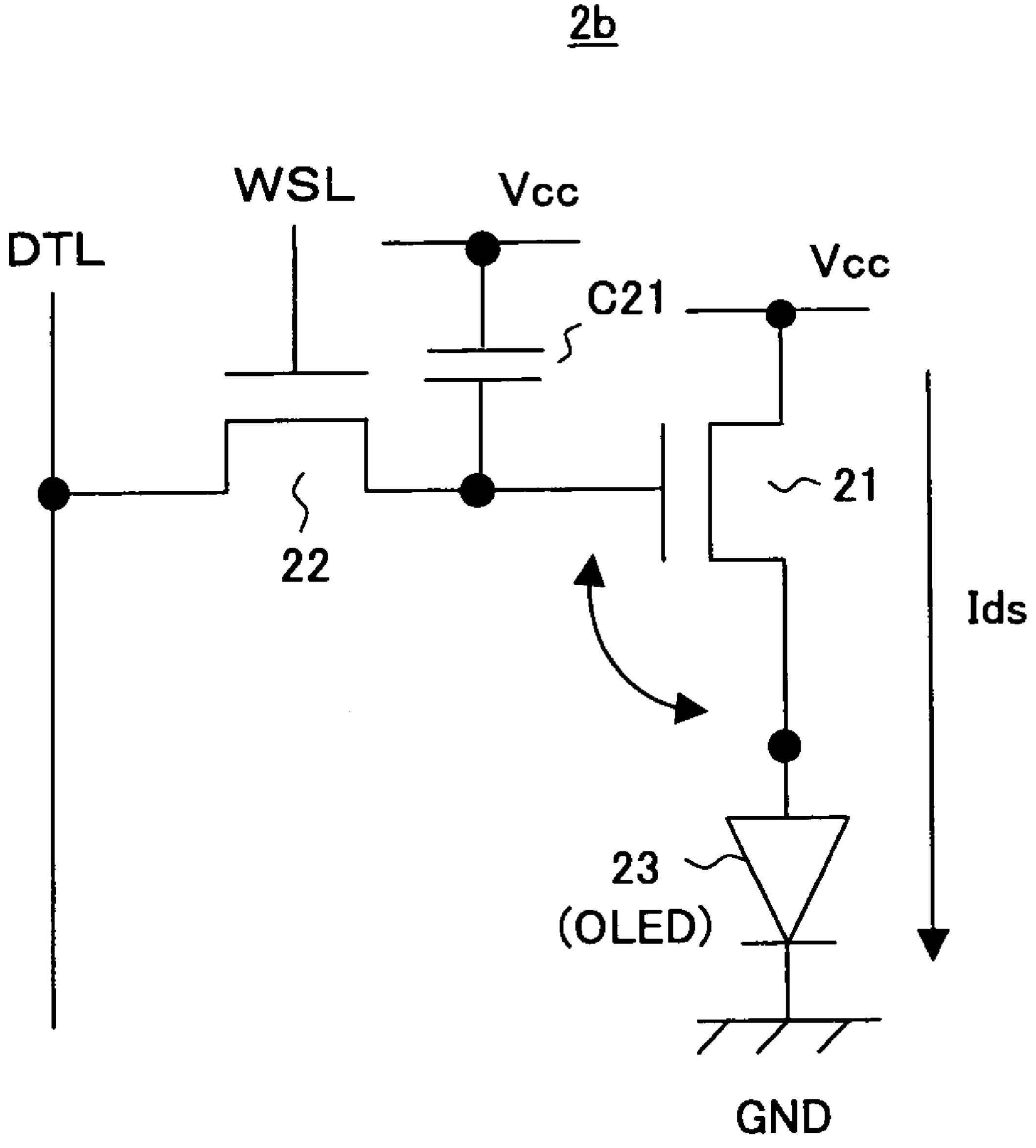
FIG. 4 is a circuit diagram of a pixel circuit in which p-channel TFTs of the circuit of FIG. 2 are replaced by n-channel TFTs.
Figure 5:
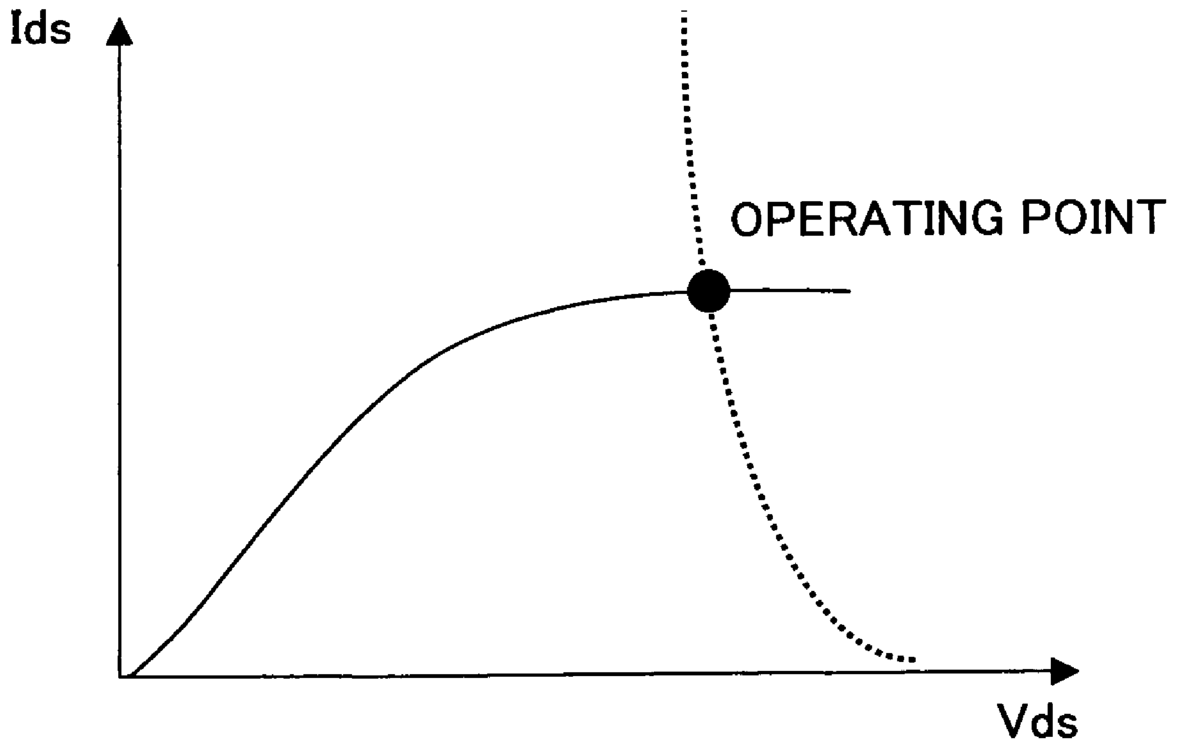
FIG. 5 is a graph showing the operating point of a TFT serving as a drive transistor and an EL emitting element in the initial state.
Figure 6:
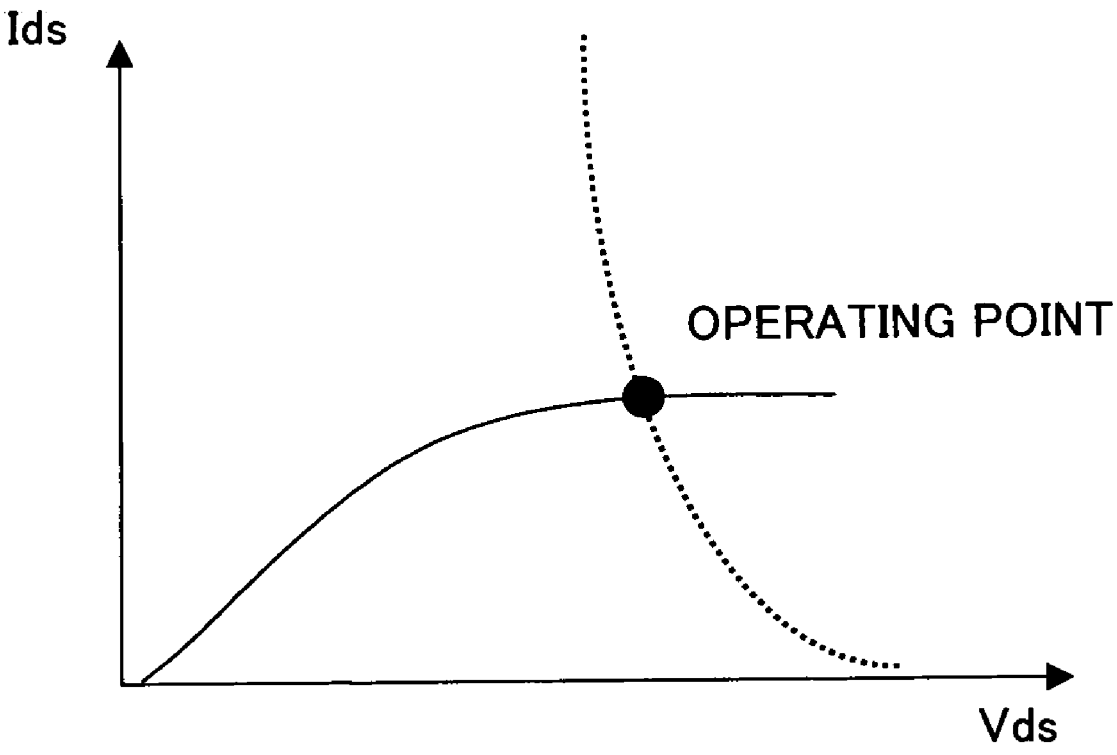
FIG. 6 is a graph showing the operating point of a TFT serving as a drive transistor and an EL emitting element after change along with time.
Figure 7:
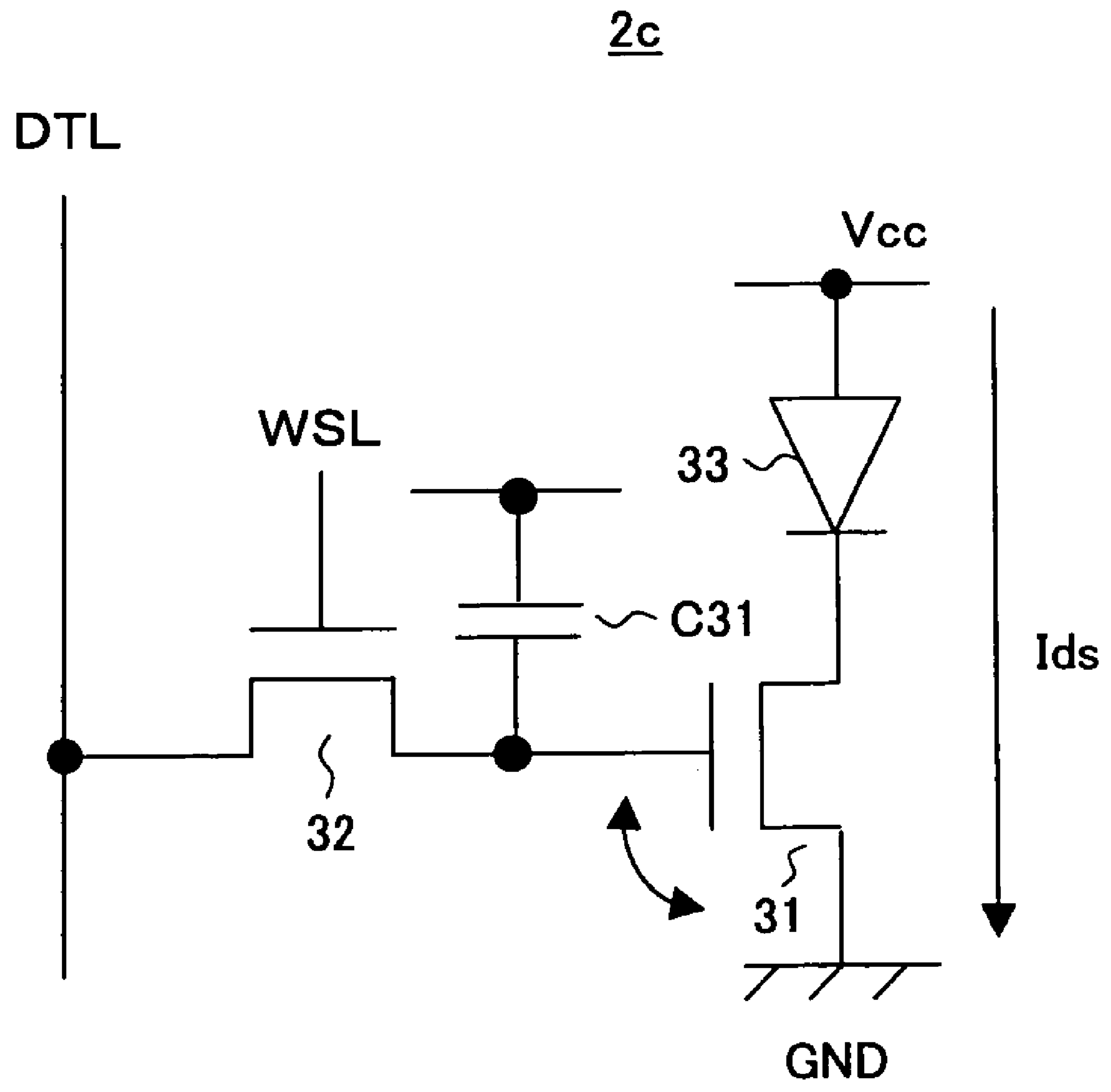
FIG. 7 is a circuit diagram of a pixel circuit connecting a source of an n-channel TFT serving as a drive transistor to a ground potential.
Figure 8:
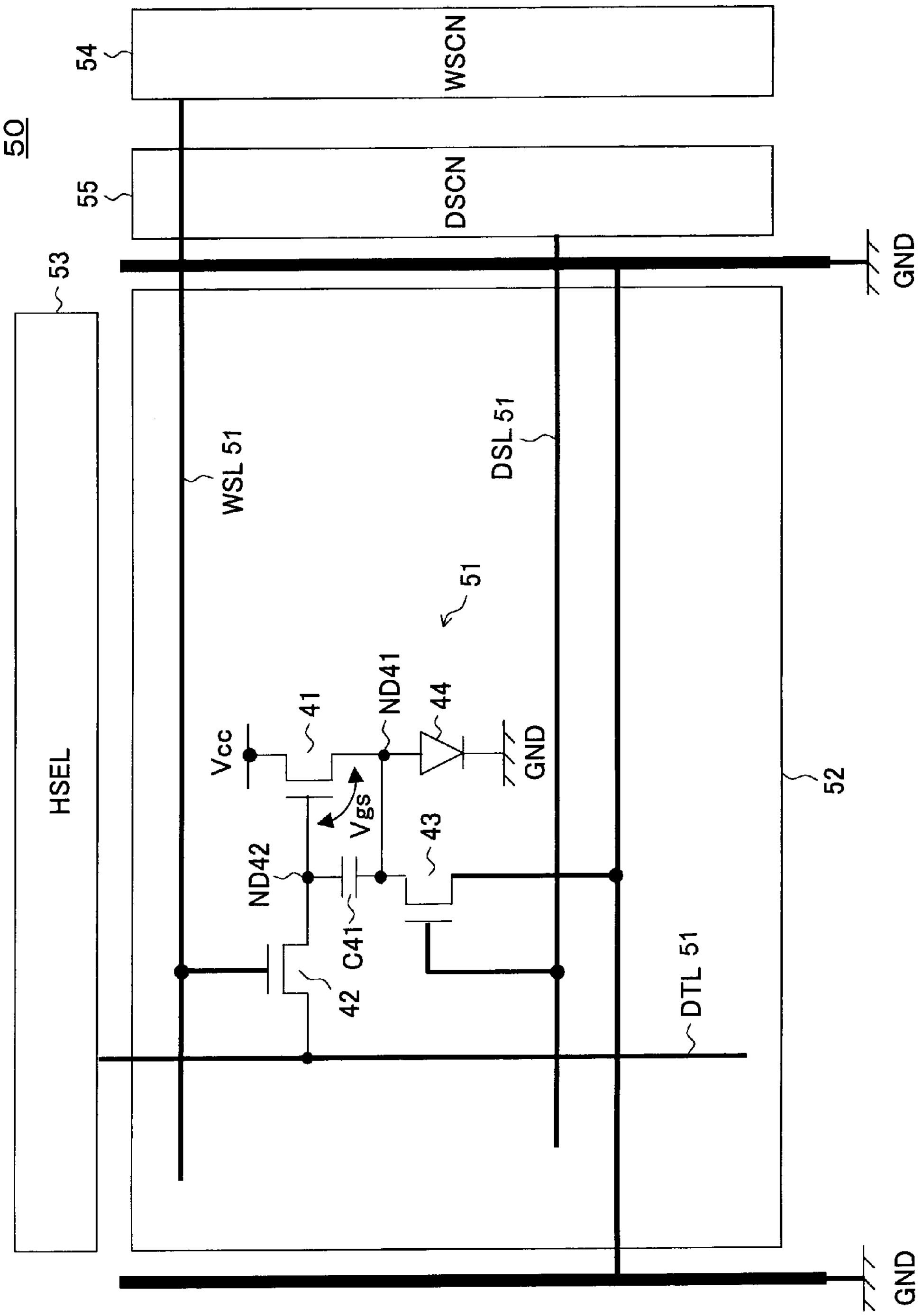
FIG. 8 is a circuit diagram of an example of an ideal pixel circuit enabling source-follower output with no deterioration of luminance even after the I-V characteristic of an EL light emitting element changes along with time.
Figure 9:
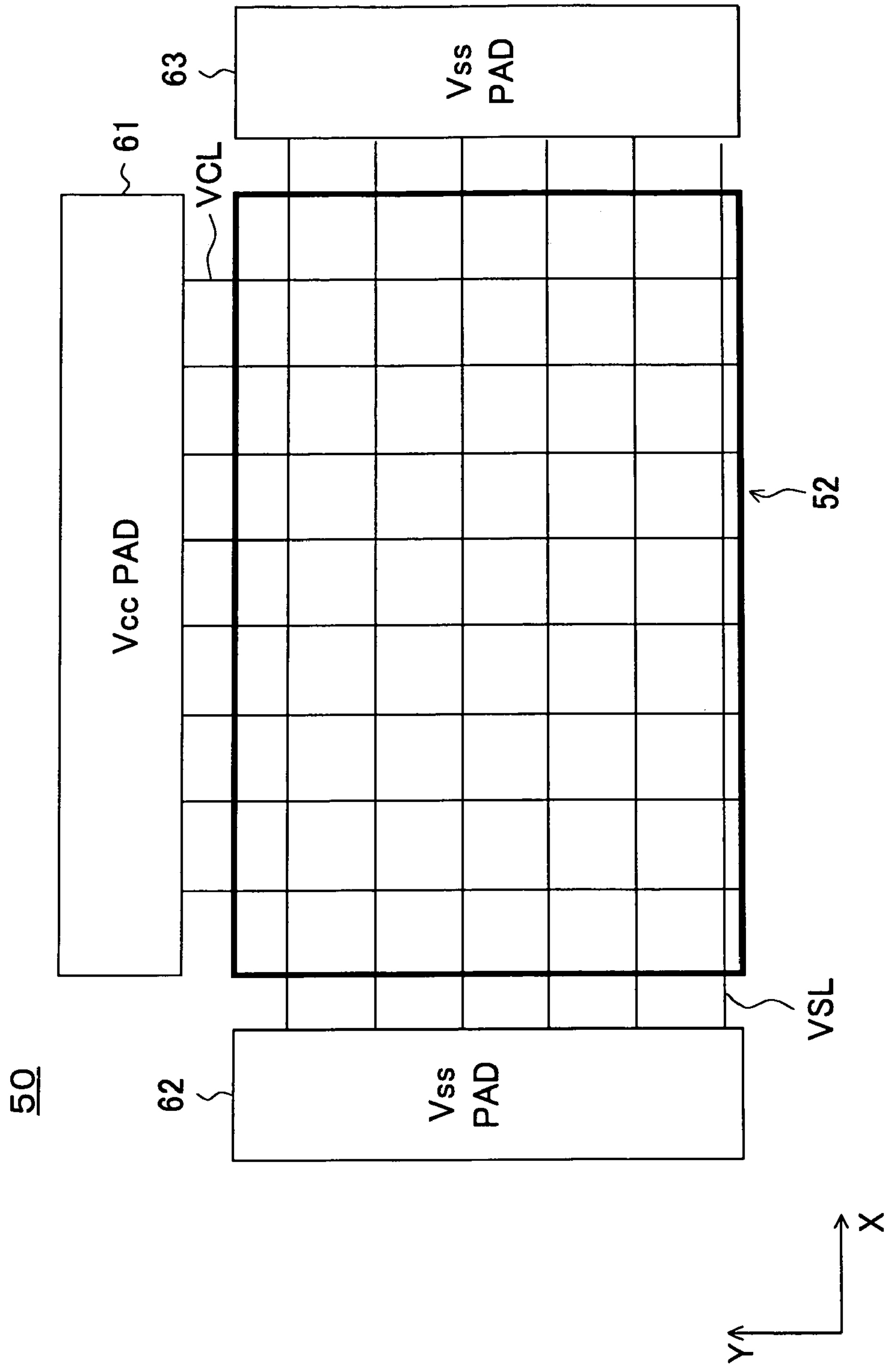
FIG. 9 is a view for explaining the layout of Vss (reference power source) interconnects and Vcc (power source voltage) interconnects in the related art.
Figure 10:
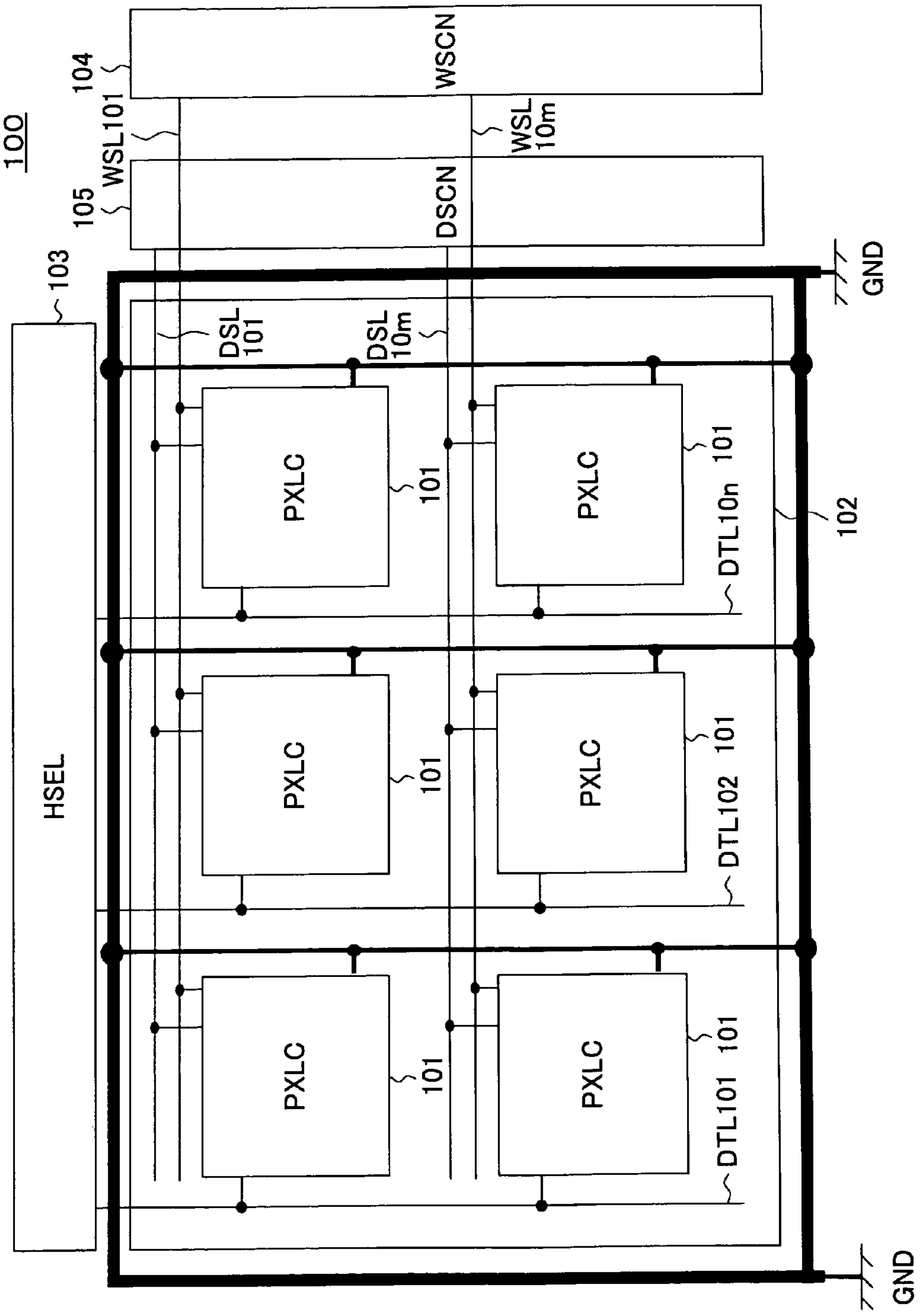
FIG. 10 is a block diagram of the configuration of an organic EL display device employing a pixel circuit according to a first embodiment of the present invention.
Figure 11:
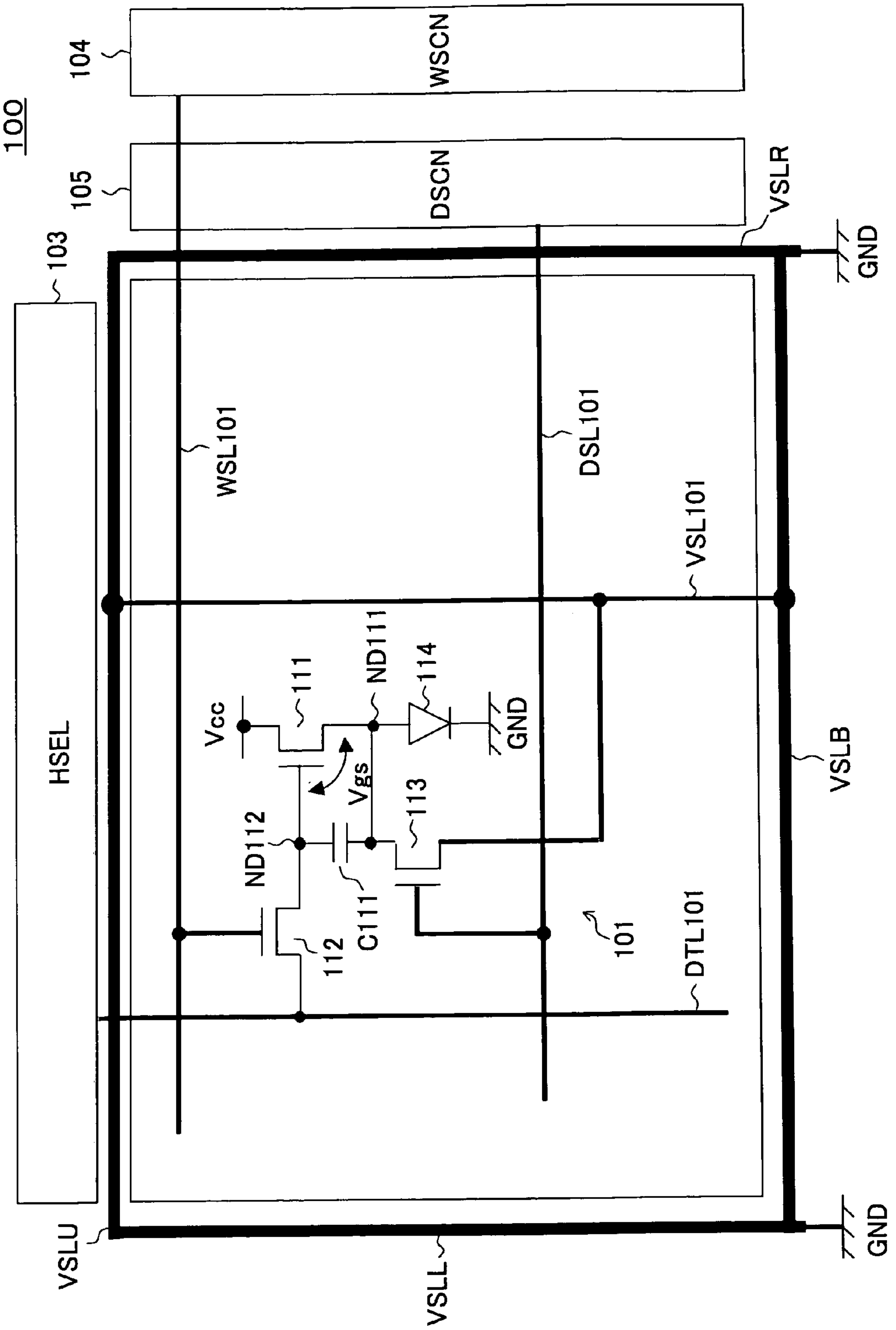
FIG. 11 is a circuit diagram of a specific configuration of a pixel circuit according to the first embodiment of the invention in the organic EL display device of FIG. 10.

FIG. 10 is a block diagram of the configuration of an organic EL display device employing pixel circuits according to the first embodiment. FIG. 11 is a circuit diagram of the concrete configuration of a pixel circuit according to the first embodiment in the organic EL display device of FIG. 10.

This display device 100 has, as shown in FIG. 10 and FIG. 11, a pixel array portion 102 having pixel circuits (PXLC) 101 arranged in an m×n matrix, a horizontal selector (HSEL) 103, a write scanner (WSCN) 104, a drive scanner (DSCN) 105, data lines DTL101 to DTL10*n* selected by the horizontal selector 103 and supplied with a data signal in accordance with the luminance information, scanning lines WSL101 to WSL10*m* selectively driven by the write scanner 104, and drive lines DSL101 to DSL10*m* selectively driven by the drive scanner 105.

Note that while the pixel circuits 101 are arranged in an m×n matrix in the pixel array portion 102, FIG. 11 shows an example wherein the pixel circuits are arranged in a 2 (=m)×3 (=n) matrix for the simplification of the drawing. Further, in FIG. 11, the concrete configuration of one pixel circuit is shown for simplification of the drawing.

The pixel circuit 101 according to the first embodiment has, as shown in FIG. 11, an n-channel TFT 111 to TFT 113, a capacitor C111, a light emitting element 114 made of an organic EL element (OLED), a node ND111, and a node ND112. Further, in FIG. 11, DTL101 indicates a data line, WSL101 indicates a scanning line, and DSL101 indicates a drive line. Among these constituent elements, TFT 111 configures the drive transistor according to the present invention, TFT 112 configures the first switch, TFT 113 configures the second switch, and the capacitor C111 configures the pixel capacitance element according to the present invention. Further, the supply line of the power source voltage Vcc corresponds to the power source voltage source, while the ground potential GND corresponds to the reference potential.

In the pixel circuit 101, a light emitting element (OLED) 114 is connected between the source of the TFT 111 and the reference potential (in this present embodiment, the ground potential GND). Specifically, the anode of the light emitting diode 114 is connected to the source of the TFT 111, while the cathode side is connected to the ground potential GND. The connection point of the anode of the light emitting element 114 and the source of the TFT 111 constitutes a node ND111. The source of the TFT 111 is connected to the drain of the TFT 113 and a first electrode of the capacitor C111, while the gate of the TFT 111 is connected to a node ND112. The source of the TFT 113 is connected to a fixed potential (in the present embodiment, a reference power source interconnect Vss line VSL101 set to the ground potential GND), while the gate of the TFT 113 is connected to the drive line DSL101. Further, a second electrode of the capacitor C111 is connected to the node ND112. The data line DTL101 and node ND112 are connected to a source and drain of the TFT 112 serving as the first switch. Further, the gate of the TFT 112 is connected to the scanning line WSL101.

In this way, the pixel circuit 101 according to the present embodiment is configured with a capacitor C111 connected between the gate and source of the TFT 111 serving as the drive transistor and with a source potential of the TFT 111 connected to a fixed potential through the TFT 113 serving as the switch transistor.

Figure 12:
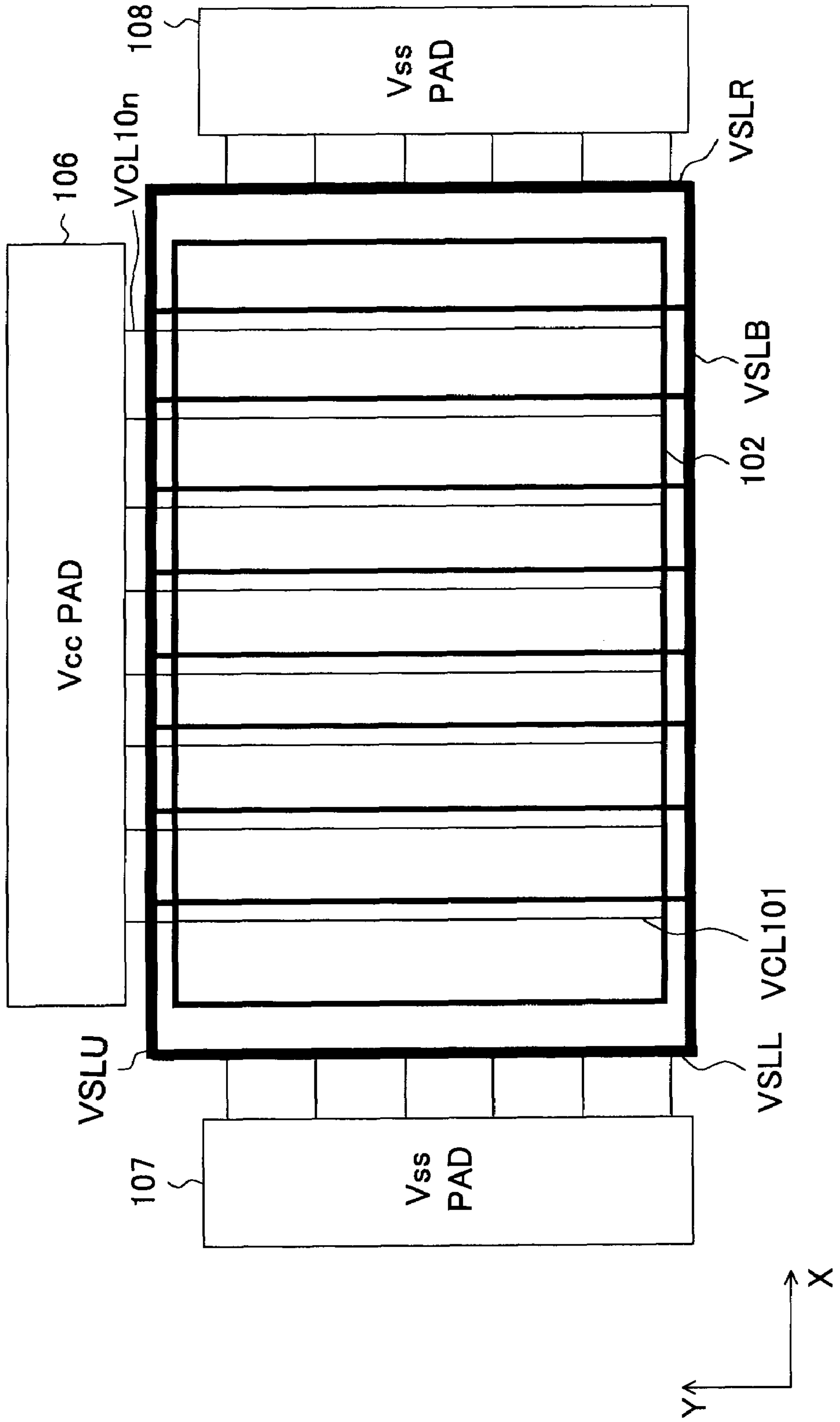
FIG. 12 is a view for explaining the layout of Vss (reference power source) interconnects and Vcc (power source voltage) interconnects according to the first embodiment of the invention.

In the present embodiment, as shown in FIG. 12, the pixel circuit power source voltage Vcc lines VCL101 to VCL10*n* are input from a pad 106 above the panel including the pixel array portion 102. These interconnects are laid out in a vertical direction with respect to the panel, that is, for every column of the pixel array. Further, the Vss lines VSL are taken out from the left and right of the panel in the figure at the cathode Vss pads 107 and 108 as the Vss lines VSLL and VSLR. Further, a Vss line VSLU connected at an upper side of the panel and a Vss line VSLB connected at a bottom side of the panel are provided. As shown in FIG. 11 and FIG. 12, the pixel circuit Vss lines VSL101 to VSL10*n* are connected between the Vss line VSLU and Vss VSLB and are arranged in parallel to the pixel circuit power source voltage Vcc lines VCL101 to VCL10*n*. That is, the Vss (reference power source) interconnects are arranged at the entire periphery of the pixel array portion 102. In the figure, the Vss lines VSL101 to VSL10*n* are laid out for each column of the pixel array between the Vss line VSLU and Vss line VSLB arranged in the x-direction above and below the pixel array portion 102. In the present embodiment, overlap between the Vss (reference power source) interconnects and Vcc (power source voltage source) interconnects is prevented. Therefore, it is possible to lay out the Vss interconnects by a lower resistance than in the past. Further, the number of pixels connected to a single interconnect is smaller in the vertical direction (y-direction) than horizontal direction (x-direction) in a general angle of view, so if the line width is the same, it is possible to lay out Vss interconnects with a lower resistance than the past.

Next, the operation of the above configuration will be explained focusing on the operation of a pixel circuit with reference to FIGS. 13A to 13F and FIGS. 14A to 14F. Note that FIG. 14A shows a scanning signal ws[101] applied to the first scanning line WSL101 of the pixel array, FIG. 14B shows a scanning signal ws[102] applied to the second scanning line WSL102 of the pixel array, FIG. 14C shows a drive signal ds[101] applied to the first drive line DSL101 of the pixel array, FIG. 14D shows a drive signal ds[101] applied to the second drive line DSL102 of the pixel array, FIG. 14E shows a gate potential Vg of the TFT 111, and FIG. 14F shows a source potential Vs of the TFT 111.

Figures 13A, 13B, 13C, 13D, 13E, 13F:
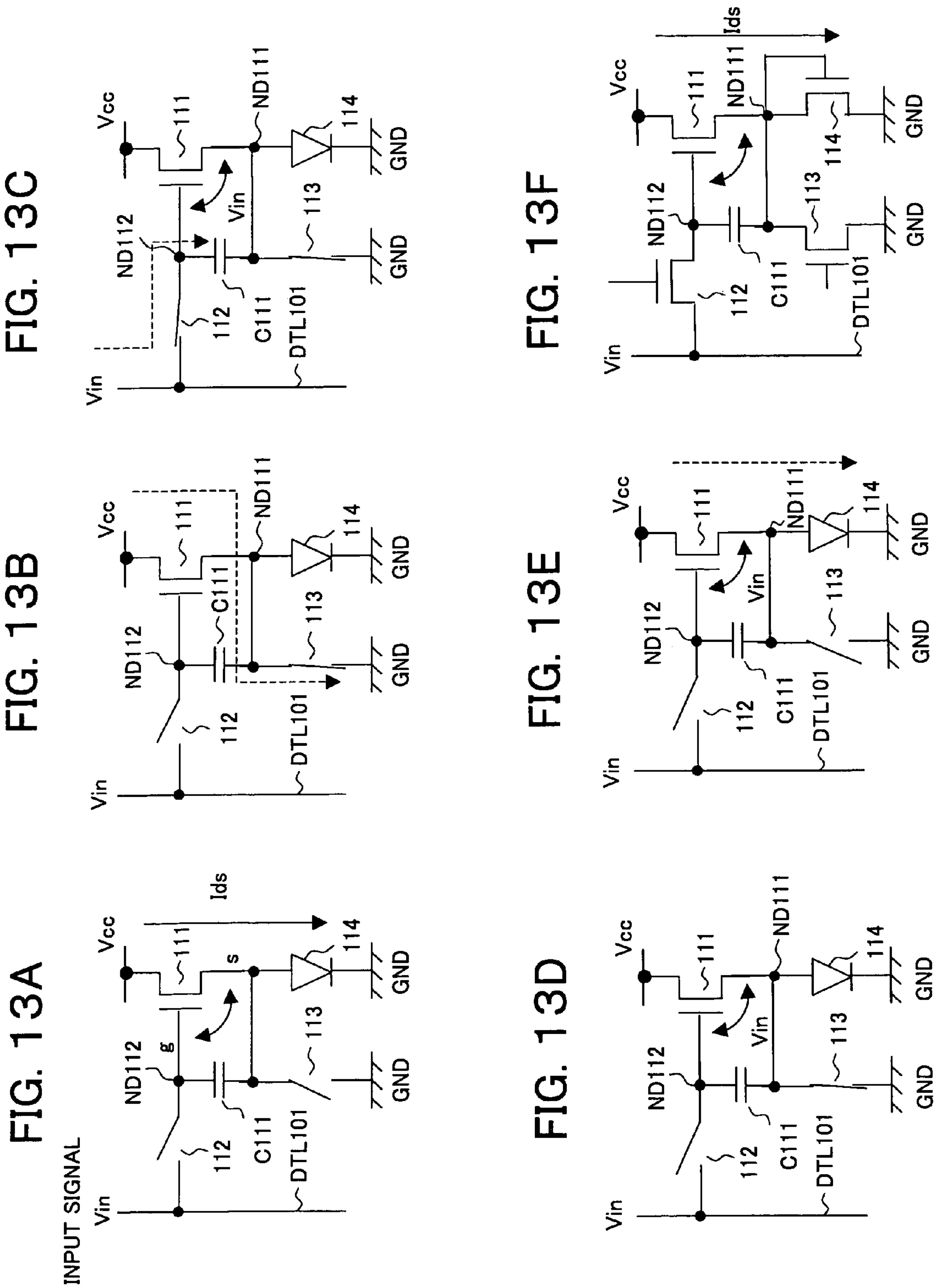
FIGS. 13A to 13F are views of equivalent circuits for explaining the operation of the circuit of FIG. 11.

First, at the time of the emitting state of an ordinary EL light emitting element 114, as shown in FIGS. 14A to 14D, the scanning signals ws[101], ws[102], . . . to the scanning lines WSL101, WSL102, . . . are selectively set to the low level by the write scanner 104, and the drive signals ds[101], ds[102], . . . to the drive lines DSL101, DSL102, . . . are selectively set to the low level by the drive scanner 105. As a result, in the pixel circuits 101, as shown in FIG. 13A, the TFT 112 and TFT 113 are held in the off state.

Next, in the non-emitting period of the EL light emitting element 114, as shown in FIGS. 14A to 14D, the scanning signals ws[101], ws[102], . . . to the scanning lines WSL101, WSL102, . . . are held at the low level by the write scanner 104, and the drive signals ds[101], ds[102], . . . to the drive lines DSL101, DSL102, . . . are selectively set to the high level by the drive scanner 105. As a result, in the pixel circuits 101, as shown in FIG. 13B, the TFT 112 is held in the off state and the TFT 113 is turned on. At this time, current flows through the TFT 113 and, as shown in FIG. 14F, the source potential Vs of the TFT 111 falls to the ground potential GND. Therefore, the voltage applied to the EL light emitting element 114 also becomes 0V and the EL light emitting element 114 becomes non-emitting in state.

Next, in the non-emitting period of the EL light emitting element 114, as shown in FIGS. 14A to 14D, the drive signals ds[101], ds[102], . . . to the drive lines DSL101, DSL102, . . . are held at the high level by the drive scanner 105, and the scanning signals ws[101], ws[102], . . . to the scanning lines WSL101, WSL102, . . . are selectively set to the high level by the write scanner 104. As a result, in the pixel circuits 101, as shown in FIG. 13C, the TFT 113 is held in the on state and the TFT 112 is turned on. Due to this, the input signal (Vin) propagated to the data line DTL101 by the horizontal selector 103 is written into the capacitor C111 as the pixel capacity. At this time, as shown in FIG. 14F, the source potential Vs of the TFT 111 serving as the drive transistor is at the ground potential level (GND level), so, as shown in FIGS. 14E and 14F, the potential difference between the gate and source of the TFT 111 becomes equal to the voltage Vin of the input signal.

After this, in the non-emitting period of the EL light emitting element 114, as shown in FIGS. 14A to 14D, the drive signals ds[101], ds[102], . . . to the drive lines DSL101, DSL102, . . . are held at the high level by the drive scanner 105 and the scanning signals ws[101], ws[102], . . . to the scanning lines WSL101, WSL102, . . . are selectively set to the low level by the write scanner 104. As a result, in the pixel circuit 101, as shown in FIG. 13D, the TFT 112 is turned off and the write operation of the input signal to the capacitor C111 serving as the pixel capacity ends.

After this, as shown in FIGS. 14A to 14D., the scanning signals ws[101], ws[102], . . . to the scanning lines WSL101, WSL102, . . . are held at the low level by the write scanner 104 and the drive signals ds[101], ds[102], . . . to the drive lines DSL101, DSL102, . . . are selectively set to the low level by the drive scanner 104. As a result, in the pixel circuit 101, as shown in FIG. 13E, the TFT 113 is turned off. By turning the TFT 113 off, as shown in FIG. 14F, the source potential Vs of the TFT 111 serving as the drive transistor rises and current also flows to the EL light emitting element 114.

The source potential Vs of the TFT 111 fluctuates, but despite this, since there is a capacity between the gate and source of the TFT 111, as shown in FIGS. 14E and 14F, the gate-source potential is constantly held at Vin. At this time, the TFT 111 serving as the drive transistor drives in the saturated region, so the current Ids flowing through the TFT 111 becomes the value shown in the above equation 1. This value is determined by the gate source potential Vin of the TFT 111. This current Ids similarly flows to the EL light emitting element 114, whereby the EL light emitting element 114 emits light. The equivalent circuit of the EL light emitting element 114 becomes as shown in FIG. 13F, so at this time the potential of the node ND111 rises to the gate potential by which the current Ids flows through the EL light emitting element 114. Along with this rise in potential, the potential of the node ND112 also similarly rises through the capacitor 111 (pixel capacity Cs). Due to this, as explained above, the gate-source potential of the TFT 111 is held at Vin.

Here, consider the problems in the source-follower system of the related art in the circuit of the present invention. In this circuit as well, the EL light emitting element deteriorates in its I-V characteristic along with the increase in the emitting period. Therefore, even if the drive transistor sends the same current, the potential applied to the EL light emitting diode changes and the potential of the node ND111 falls. However, in this circuit, the potential of the node ND111 falls while the gate-source potential of the drive transistor is held constant, so the current flowing through the drive transistor (TFT 111) does not change. Accordingly, the current flowing through the EL light emitting element also does not change. Even if the I-V characteristic of the EL light emitting element deteriorates, a current corresponding to the input voltage Vin constantly flows. Therefore, the problem of the related art can be solved.

As explained above, according to the present embodiment, the source of each TFT 111 serving as a drive transistor is connected to the anode of the light emitting element 114, the drain is connected to the power source potential Vcc, a capacitor C111 is connected between the gate and source of the TFT 111, and the source potential of the TFT 111 is connected to a fixed potential through the TFT 113 serving as the switch transistor and, further, the pixel circuit Vss lines VSL101 to VSL10*n* are connected by the Vss line VSLU and Vss line VSLB and arranged in parallel to the pixel circuit power source voltage Vcc lines VCL101 to VCL10*n*, so the following effects can be obtained.

Since the Vss interconnects are laid out in the y-direction (vertical direction), the TFTs 113 of the pixel circuits connected to the Vss lines VSL101 to VSL10*n* turn on at a single timing for 1H. Therefore, the fluctuation entering the interconnects becomes smaller and the uniformity is improved.

In addition, as explained above, the Vcc interconnects of the pixel array portion 102 are generally laid out in parallel in the y-direction with respect to the panel. Accordingly, in this embodiment, in the interconnects at the valid pixel portion, it is possible to lay out the Vss interconnects and the Vcc interconnects in parallel and possible to prevent overlap of the Vss interconnects and Vcc interconnects. Therefore, it is possible to lay out the Vss interconnects with less resistance than the past. In addition, the number of pixels connected to a single interconnect is smaller in the vertical direction (y-direction) than the horizontal direction (x-direction) in a general angle of view, so with the same line width, it is possible to lay out the Vss interconnects by a lower resistance than the past. Further, source-follower output with no deterioration in luminance even with a change in the I-V characteristic of an EL light emitting element along with time becomes possible. Further, a source-follower circuit of n-channel transistors becomes possible, so it is possible to use an n-channel transistor as a drive element of an EL light emitting element while using current anode-cathode electrodes. Further, it is possible to configure transistors of a pixel circuit by only n-channel transistors and possible to use the a-Si process in the fabrication of the TFTs. Due to this, there is the advantage that a reduction of the cost of TFT substrates becomes possible.

Second Embodiment

Figure 15:
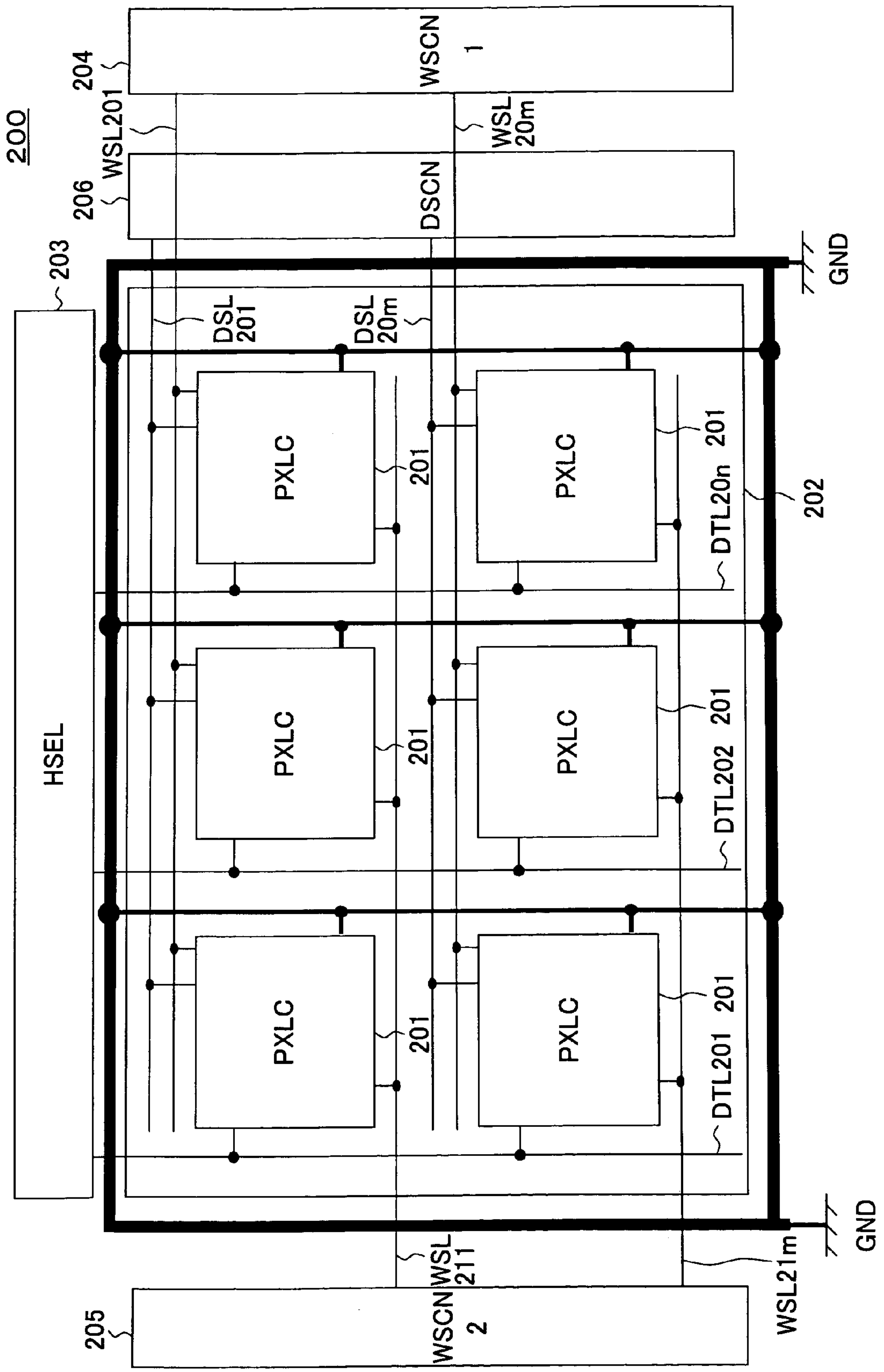
FIG. 15 is a block diagram of the configuration of an organic EL display device employing a pixel circuit according to a second embodiment of the present invention.
Figure 16:
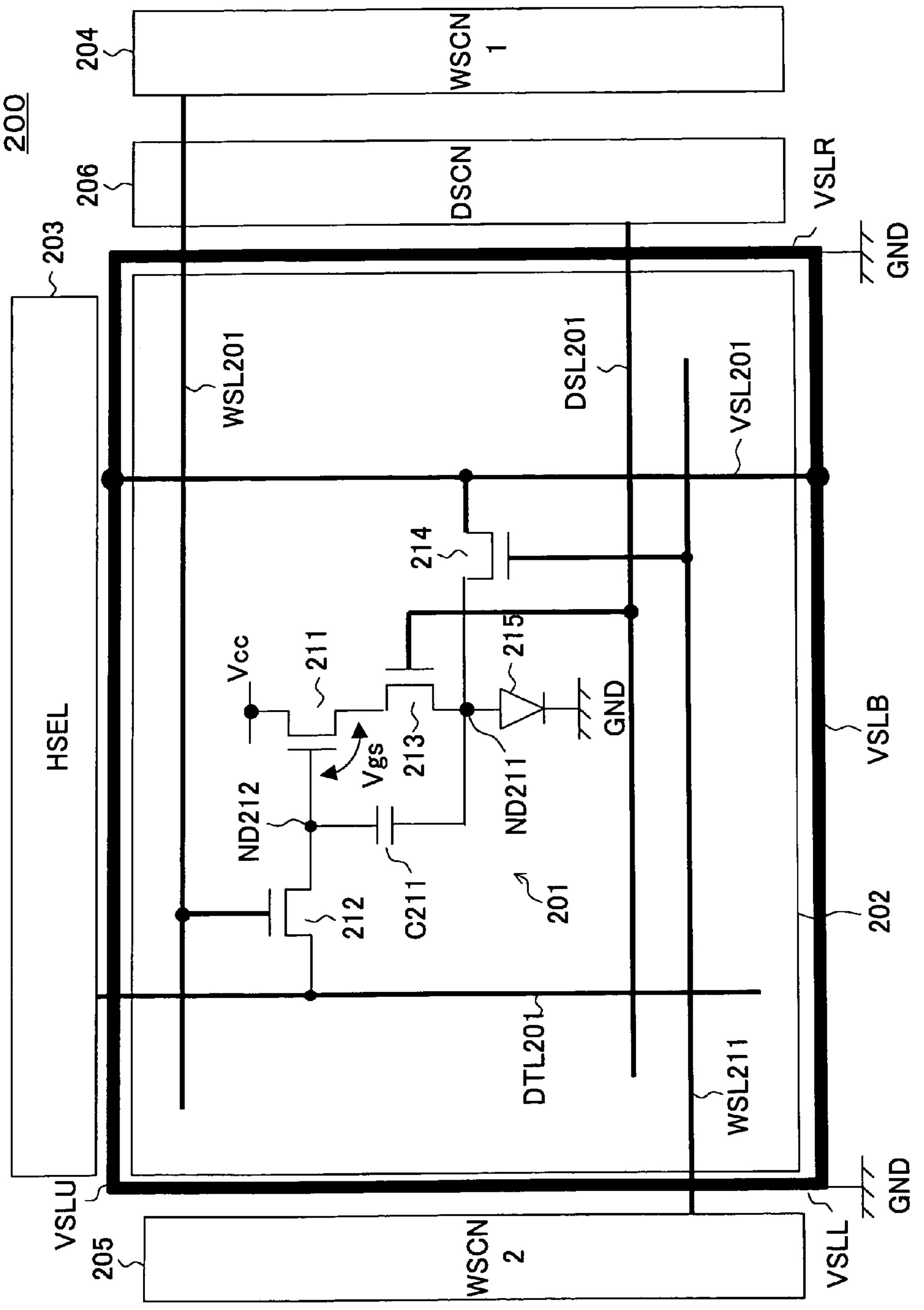
FIG. 16 is a circuit diagram of a specific configuration of a pixel circuit according to the second embodiment of the invention in the organic EL display device of FIG. 15.

FIG. 15 is a block diagram of the configuration of an organic EL display device employing pixel circuits according to a second embodiment. FIG. 16 is a circuit diagram of the concrete configuration of a pixel circuit according to the second embodiment in the organic EL display device of FIG. 15.

The display device 200, as shown in FIG. 15 and FIG. 16, has a pixel array portion 202 having pixel circuits (PXLC) 201 arranged in an m×n matrix, a horizontal selector (HSEL) 203, a first write scanner (WSCN1) 204, a second write scanner (WSCN2) 205, a drive scanner (DSCN) 206, data lines DTL201 to DTL20*n* selected by the horizontal selector 203 and supplied with a data signal in accordance with the luminance information, scanning lines WSL201 to WSL20*m* selectively driven by the write scanner 204, scanning lines WSL211 to WSL21*m* selectively driven by the write scanner 205, and drive lines DSL201 to DSL20*m* selectively driven by the drive scanner 206.

Note that while the pixel circuits 201 are arranged in an m×n matrix in the pixel array portion 202, FIG. 15 shows an example wherein the pixel circuits are arranged in a 2 (=m)×3 (=n) matrix for the simplification of the drawing. Further, in FIG. 16 as well, the concrete configuration of one pixel circuit is shown for simplification of the drawing.

In the second embodiment as well, like in the first embodiment, as shown in FIG. 12, the pixel circuit power source voltage Vcc lines VCL201 to VCL20*n* are input from a pad 106 above the panel including the pixel array portion 202 and are laid out in the vertical direction with respect to the panel, that is, for each column of the pixel array. Further, the Vss lines VSL are taken out from the left and right of the panel in the figure at the cathode Vss pads 107 and 108 as the Vss lines VSLL and VSLR. Further, a Vss line VSLU connected at an upper side of the panel and a Vss line VSLB connected at a bottom side of the panel are provided. As shown in FIG. 16 and FIG. 12, the pixel circuit Vss lines VSL101 to VSL10*n* are connected between the Vss line VSLU and Vss line VSLB and are arranged in parallel to the pixel circuit power source voltage Vcc lines VCL201 to VCL20*n*. That is, the Vss (reference power source) interconnects are arranged at the entire periphery of the pixel array portion 202. In the figure, Vss lines VSL201 to VSL20*n* are laid out for each column of the pixel array between the Vss line VSLU and Vss line VSLB arranged in the x-direction above and below the pixel array portion 202. In the present embodiment, overlap between the Vss (reference power source) interconnects and the Vcc (power source voltage source) interconnects is prevented. Therefore, the Vss interconnects can be laid out by a lower resistance than in the past. Further, the number of pixels connected to a single interconnect is smaller in the vertical direction (y-direction) than the horizontal direction (x-direction) in a general angle of view, so with the same line width, it is possible to lay out the Vss inerconnects with a lower resistance than the past.

Each pixel circuit 201 according to the second embodiment has, as shown in FIG. 16, an n-channel TFT 211 to TFT 214, a capacitor C211, a light emitting element 215 made of an organic EL element (OLED), a node ND211, and a node ND212. Further, in FIG. 16, DTL201 indicates a data line, WSL201 and WSL211 indicate scanning lines, and DSL201 indicates a drive line. Among these constituent elements, TFT 211 configures the FET according to the present invention, TFT 212 configures the first switch, TFT 213 configures the second switch, TFT 214 configures the third switch, and the capacitor C211 configures the pixel capacitance element according to the present invention. Further, the supply line of the power source voltage Vcc corresponds to the power source voltage source, while the ground potential GND corresponds to the reference potential.

In each pixel circuit 201, the source and drain of the TFT 213 are connected between the source of the TFT 211 and the anode of the light emitting element 215, the drain of the TFT 211 is connected to the power source potential Vcc, and the cathode of the light emitting element 215 is connected to the ground potential GND. That is, the TFT 211 serving as the drive transistor, the TFT 213 serving as the switch transistor, and the light emitting element 215 are connected in series between the power source potential Vcc and the ground potential GND. Further, the connection point of the source of the TFT 213 and the anode of the light emitting element 215 constitutes a node ND211. The gate of the TFT 211 is connected to the node ND212. Further, a capacitor C211 serving as the pixel capacity Cs is connected between the nodes ND211 and ND212, that is, between the gate and source of the TFT 211. The first electrode of the capacitor C211 is connected to the node ND211, while the second electrode is connected to the node ND212. The gate of the TFT 213 is connected to the drive line DSL201. Further, the source and drain of the TFT 212 serving as the first switch are connected to the data line DTL201 and the node ND212. Further, the gate of the TFT 212 is connected to the scanning line WSL201. Further, the source and drain of the TFT 214 are connected between the source (node ND211) of the TFT 213 and the Vss line VSL201, while the gate of the TFT 214 is connected to the scanning line WSL211.

In this way, the pixel circuit 201 according to the present embodiment is configured with the source of the TFT 211 serving as the drive transistor and the anode of the light emitting element 215 connected by the TFT 213 serving as the switching transistor, with a capacitor C211 connected between the gate and source of the TFT 211, and with a source potential of the TFT 213 connected to the reference power source interconnect constituted by the Vss line VSL201 (fixed voltage line) through the TFT 214.

Figures 17A, 17B, 17C, 17D, 17E:
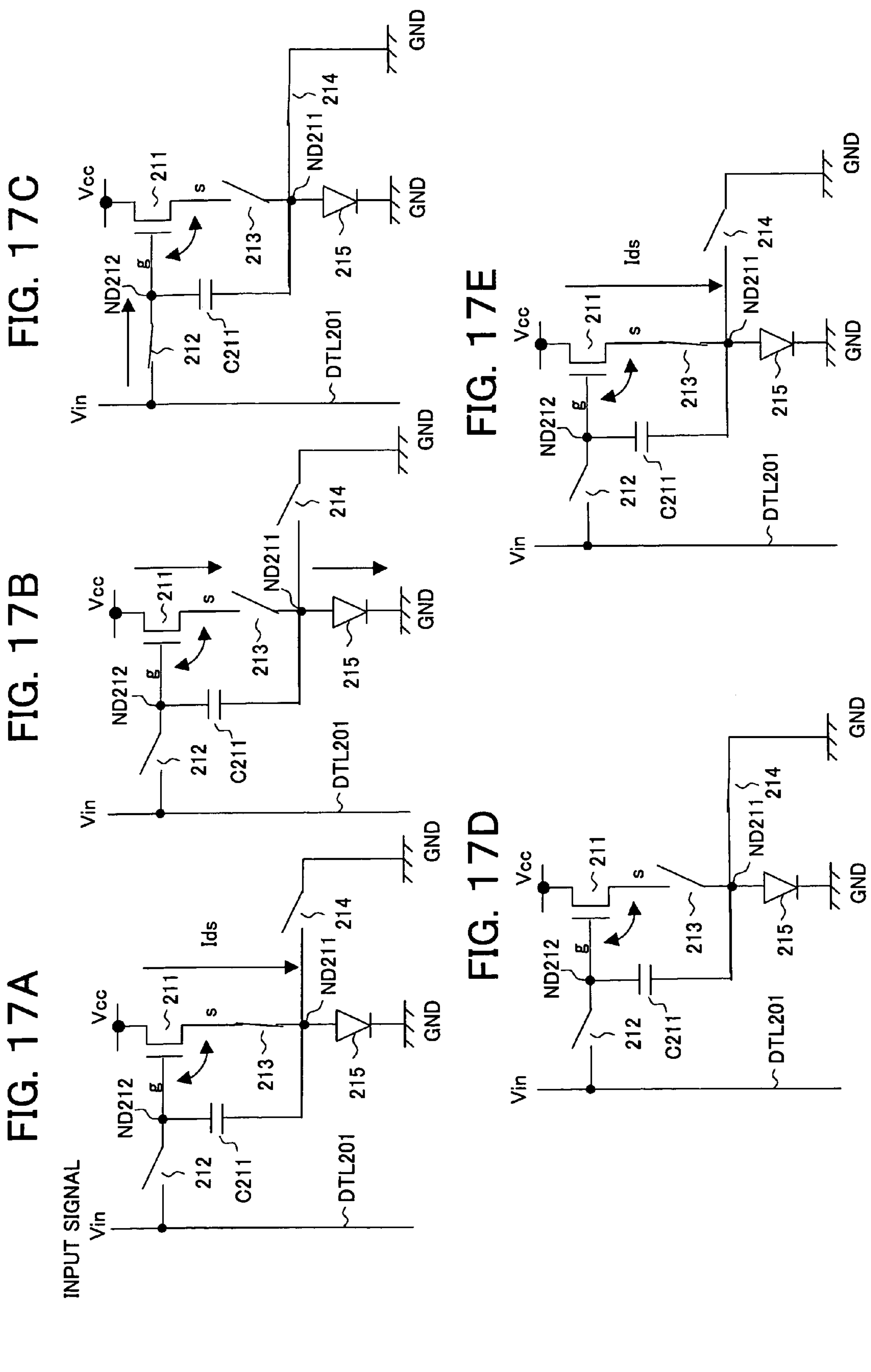
FIGS. 17A to 17E are views of equivalent circuits for explaining the operation of the circuit of FIG. 16.
Figures 18A, 18B, 18C, 18D, 18E, 18F, 18G, 18H:
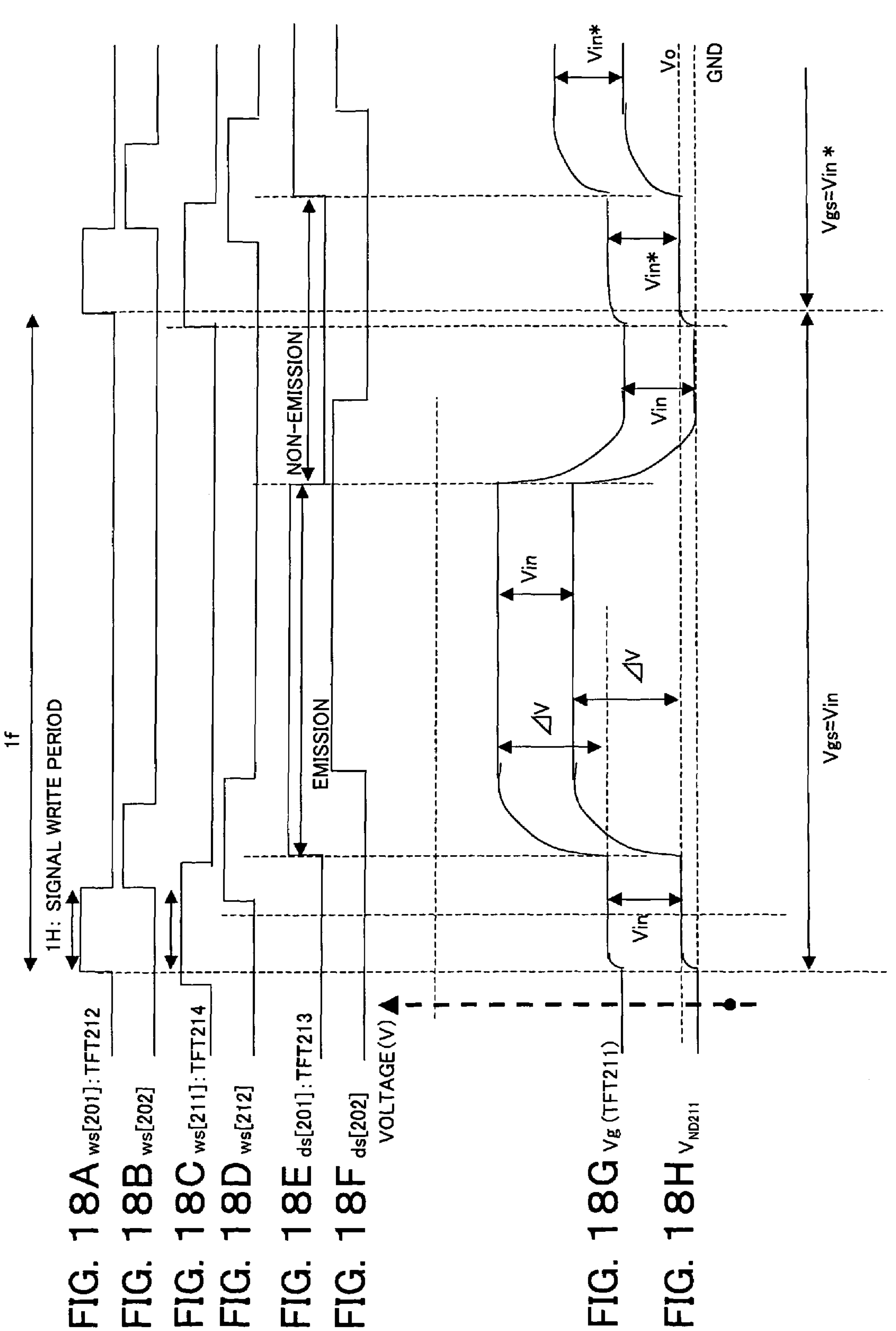
FIGS. 18A to 18H are timing charts for explaining the operation of the circuit of FIG. 16.

Next, the operation of the above configuration will be explained focusing on the operation of a pixel circuit with reference to FIGS. 17A to 17E and FIGS. 18A to 18H. Note that FIG. 18A shows a scanning signal ws[201] applied to the first scanning line WSL201 of the pixel array, FIG. 18B shows a scanning signal ws[202] applied to the second scanning line WSL202 of the pixel array, FIG. 18C shows a scanning signal ws[211] applied to the first scanning line WSL211 of the pixel array, FIG. 18D shows a scanning signal ws[212] applied to the second scanning line WSL212 of the pixel array, FIG. 18E shows a drive signal ds[201] applied to the first drive line DSL201 of the pixel array, FIG. 18F shows a drive signal ds[202] applied to the second drive line DSL202 of the pixel array, FIG. 18G shows a gate potential Vg of the TFT 211, and FIG. 18H shows an anode side potential of the TFT 211, that is, the potential VND211 of the node ND211.

First, at the ordinary emitting state of an EL light emitting element 215, as shown in FIGS. 18A to 18F, the scanning signals ws[201], ws[202], . . . to the scanning lines WSL201, WSL202, . . . are selectively set to the low level by the write scanner 204, the scanning signals ws[211], ws[212], . . . to the scanning lines WSL211, WSL212, . . . are selectively set to the low level by the write scanner 205, and the drive signals ds[201], ds[202], . . . to the drive lines DSL201, DSL202, . . . are selectively set to the high level by the drive scanner 206. As a result, in the pixel circuit 201, as shown in FIG. 17A, the TFT 212 and TFT 214 are held in the off state and the TFT 213 is held in the on state. At this time, the TFT 211 serving as the drive transistor drives in the saturated region, so the current Ids for the gate-source voltage Vgs flows to the TFT 211 and the EL light emitting element 215.

Next, in the non-emitting period of an EL light emitting element 215, as shown in FIGS. 18A to 18F, the scanning signals ws[201], ws[202], . . . to the scanning lines WSL201, WSL202, . . . are held at the low level by the write scanner 204, the scanning signals ws[211], ws[212], . . . to the scanning lines WSL211, WSL212, . . . are held at the low level by the write scanner 205, and the drive signals ds[201], ds[202], . . . to the drive lines DSL201, DSL202, . . . are selectively set to the low level by the drive scanner 206. As a result, in the pixel circuit 201, as shown in FIG. 17B, the TFT 212 and TFT 214 are held in the off state and the TFT 213 is turned off. At this time, the potential held at the EL light emitting element 215 falls since the source of supply disappears and the EL light emitting element 215 no longer emits light. The potential falls to the threshold voltage Vth of the EL light emitting element 215. However, since current also flows to the EL light emitting element 215, if the non-emitting period continues, the potential will fall to GND. On the other hand, the TFT 211 serving as the drive transistor is held in the on state since the gate potential is high. As shown in FIG. 18G, the source potential of the TFT 211 is boosted to the power source voltage Vcc. This boosting is performed in a short period. After boosting of the Vcc, no current is supplied to the TFT 211. That is, in the pixel circuit 201 of the second embodiment, it is possible to operate without the supply of current in the pixel circuit during the non-emitting period and therefore possible to suppress the power consumption of the panel.

Next, in the non-emitting period of an EL light emitting element 215, as shown in FIGS. 18A to 18F, the drive signals ds[201], ds[202], . . . to the drive lines DSL201, DSL 202, . . . are held at the low level by the drive scanner 206, the scanning signals ws[201], ws[202], . . . to the scanning lines WSL201, WSL202, . . . are selectively set to the high level by the write scanner 204, and the scanning signals ws[211], ws[212], . . . to the scanning lines WSL211, WSL212, . . . are selectively set to the high level by the write scanner 205. As a result, in the pixel circuit 201, as shown in FIG. 17C, the TFT 213 is held in the off state and the TFT 212 and TFT 214 are turned on. Due to this, the input signal (Vin) propagated to the data line DTL201 by the horizontal selector 203 is written into the capacitor C211 serving as the pixel capacity Cs. When writing the signal line voltage, it is important that the TFT 214 be turned on. If there were no TFT 214, if the TFT 212 were turned on and the video signal were written in the pixel capacity Cs, coupling would enter the source potential Vs of the TFT 211. As opposed to this, if turning on the TFT 214 connecting the node ND211 to the Vss line VSL201, it will be connected to the low impedance interconnect line, so the voltage of the interconnect line would be written into the source potential of the TFT 211. At this time, if making the potential of the interconnect line Vo, the source potential of the TFT 211 serving as the drive transistor becomes Vo, so a potential equal to (Vin−Vo) is held with respect to the voltage Vin of the input signal at the fixed capacity Cs.

After this, in the non-emitting period of the EL light emitting element 215, as shown in FIGS. 18A to 18F, the drive signals ds[201], ds[202], . . . to the drive lines DSL201, DSL202, . . . are held at the low level by the drive scanner 206, the scanning signals ws[211], ws[212], . . . to the scanning lines WSL211, WSL212, . . . are held at the high level by the write scanner 205, and the scanning signals ws[201], ws[202], . . . to the scanning lines WSL201, WSL202, . . . are selectively set to the low level by the write scanner 204. As a result, in the pixel circuit 201, as shown in FIG. 17D, the TFT 212 is turned off and the write operation of the input signal to the capacitor C211 serving as the pixel capacity ends. At this time, the source potential of the TFT 211 has to hold the low impedance, so the TFT 214 is left on.

After this, as shown in FIGS. 18A to 18F, the scanning signals ws[201], ws[202], . . . to the scanning lines WSL201, WSL202, . . . are held at the low level by the write scanner 204, the scanning signals ws[211], ws[212], . . . to the scanning lines WSL211, WSL212, . . . are set to the low level by the write scanner 205, and the drive signals ds[201], ds[202], . . . to the drive lines DSL201, DSL202, . . . are selectively set to the high level by the drive scanner 206. As a result, in the pixel circuit 201, as shown in FIG. 17E, the TFT 214 is turned off and the TFT 213 is turned on. By turning the TFT 213 on, current flows to the EL light emitting element 215 and the source potential of the TFT 211 serving as the drive transistor falls. The source potential Vs of the TFT 1211 serving as the drive transistor fluctuates, but despite this, since there is a capacity between the gate of the TFT 211 and the anode of the EL light emitting element 215, the gate-source potential of the TFT 211 is constantly held at (Vin−Vo).

At this time, the TFT 211 serving as the drive transistor drives in the saturated region, so the current Ids flowing through the TFT 211 becomes the value shown in the above equation 1. This is the gate-source voltage Vgs of the drive transistor and is (Vin−Vo). That is, the current flowing through the TFT 211 can be said to be determined by the Vin.

In this way, by turning the TFT 214 on during a signal write period to make the source of the TFT 211 low in impedance, it is possible to make the source side of the TFT 211 of the pixel capacitor a fixed potential (Vss) at all times, there is no need to consider deterioration of image quality due to coupling at the time of a signal line write operation, and it is possible to write the signal line voltage in a short time. Further, it is possible to increase the pixel capacity to take measures against a leak characteristic.

Due to the above, even if the EL light emitting element 215 changes in its I-V characteristic along with the increase in the emitting period, in the pixel circuit 201 of the second embodiment, the potential of the node ND211 falls while the potential between the gate and source of the TFT 211 serving as the drive transistor is held constant, so the current flowing through the TFT 211 does not change. Accordingly, the current flowing through the EL light emitting element 215 also does not change. Even if the I-V characteristic of the EL light emitting element 215 deteriorates, the current corresponding to the input voltage Vin constantly flows. Source-follower output with no deterioration of the luminance becomes possible even if the I-V characteristic of the EL light emitting element changes along with time. In addition, since there is no transistor other than the pixel capacitor Cs between the gate and source of the TFT 211, the gate-source voltage Vgs of the TFT 211 serving as the drive transistor will not change due to fluctuations in the threshold voltage Vth like in the conventional system.

Further, in FIG. 16, the potential of the cathode electrode of the light emitting element 215 is made the ground potential GND, but this may be made any other potential as well. Rather, making it a negative power source enables the potential of the Vcc to be lowered and enables the potential of the input signal voltage to be lowered as well. Due to this, it is possible to design a circuit without placing a load on the external IC.

The transistors of the pixel circuits need not be n-channel transistors. p-channel TFTs may also be used to form each pixel circuit. In this case, the power source is connected to the anode side of the EL light emitting element, while the TFT 211 serving as the drive transistor is connected to the cathode side.

Further, the TFT 212, TFT 213, and TFT 214 serving as the switching transistors may also be transistors of different polarities from the TFT 211 serving as the drive transistor.

According to the second embodiment, since the Vss interconnects are laid out in the y-direction, the TFTs 213 of the pixel circuits connected to the Vss lines VSL201 to VSL**20*n* turn on at a single timing with respect to 1H. Accordingly, there is little fluctuation entering the interconnects and the uniformity can be improved. In addition, as explained above, the Vcc interconnects of the pixel array portion 202** are in general laid out in parallel to the y-direction with respect to the panel. Therefore, according to the present embodiment, in the interconnects at the valid pixel parts, the Vss interconnects and Vcc interconnects can be laid out in parallel and overlap between the Vss interconnects and Vcc interconnects can be prevented. For this reason, the Vss interconnects can be laid out with a lower resistance than the past. Further, the number of pixels connected to a single interconnect is smaller in the vertical direction (y-direction) than the horizontal direction (x-direction) in a general angle of view, so if the line width is the same, it is possible to lay out Vss interconnects with a lower resistance than the past. Further, source-follower output with no deterioration in luminance even with a change in the I-V characteristic of the organic EL emitting element along with time becomes possible. A source-follower circuit of n-channel transistors becomes possible, so it is possible to use an n-channel transistor as a drive element of an organic EL emitting element while using current anode-cathode electrodes. Further, it is possible to configure transistors of a pixel circuit by only n-channel transistors and possible to use the a-Si process in the fabrication of the TFTs. Due to this, there is the advantage that a reduction of the cost of TFT substrates becomes possible. In addition, according to the second embodiment, it is possible to write a signal line voltage in a short time even for example with a black signal and therefore possible to obtain an image quality of a high uniformity. Simultaneously, it is possible to increase the signal line capacity and suppress a leak characteristic.

Summarizing the effects of the invention, as explained above, according to the present invention, the pixel circuits connected to the reference power source interconnects turn on at a single timing during the signal sampling period. Therefore, there is little fluctuation entering the interconnects and the uniformity can be improved. In addition, it is possible to prevent overlap between the reference power source interconnects and the power source voltage source interconnects. Therefore, it is possible to lay out the reference power source interconnects by a lower resistance than the past. In addition, the number of pixels connected to a single interconnect is smaller in the vertical direction (y-direction) than the horizontal direction (x-direction) in a general angle of view, so with the same line width, it is possible to lay out the reference power source interconnects by a lower resistance than the past.

Further, according to the present invention, source-follower output with no deterioration in luminance even with a change in the I-V characteristic of the organic EL emitting element along with time becomes possible. Further, a source-follower circuit of n-channel transistors becomes possible, so it is possible to use an n-channel transistor as a drive element of an organic EL emitting element while using current anode-cathode electrodes. Further, it is possible to configure transistors of a pixel circuit by only n-channel transistors and possible to use the a-Si process in the fabrication of the TFTs. Due to this, there is the advantage that a reduction of the cost of TFT substrates becomes possible.

While the invention has been described with reference to specific embodiments chosen for purpose of illustration, it should be apparent that numerous modifications could be made thereto by those skilled in the art without departing from the basic concept and scope of the invention.

What we claim is:

1. A pixel circuit for driving an electro-optic element with a luminance changing according to a flowing current, comprising:

a drive transistor forming a current supply line between a first terminal and a second terminal and controlling a current flowing through said current supply line in accordance with the potential of a control terminal;

a first node;

a power source voltage source interconnect;

a reference power source interconnect; and a first circuit for connecting said first node to said reference power source interconnect for making a potential of said first node change to a fixed potential while said electro-optic element is not emitting light;

said current supply line of the drive transistor, said first node, and said electro-optic element being connected in series between said power source voltage source and reference potential;

the power source voltage source interconnect and said reference power source interconnect being laid out in the same direction so as not to have intersecting parts.

2. A pixel circuit as set forth in claim 1, further comprising:

a data line through which a data signal in accordance with luminance information is supplied;

a second node;

a first control line;

a pixel capacitance element connected between said first node and said second node; and a first switch between said data line and said second node and controlled in conduction by said first control line.

3. A pixel circuit as set forth in claim 2, further comprising:

a second control line;

said drive transistor comprises a field effect transistor with a source connected to said first node, a drain connected to said power source voltage source interconnect or reference potential, and a gate connected to said second node; and said first circuit includes a second switch connected between said first node and fixed potential and controlled in conduction by said second control line.

4. A pixel circuit as set forth in claim 3, wherein when said electro-optic element is driven, as a first stage, said first switch is held in a non-conductive state by said first control line and, in that state, said second switch is held in a conductive state and said first node is connected to a fixed potential by said second control line;

as a second stage, said first switch is held in a conductive state by said first control line, data to be propagated over said data line is written in said pixel capacitance element, then said first switch is held in a non-conductive state; and as a third stage, said second switch is held in a non-conductive state by said second control line.

5. A display device comprising:

a plurality of pixel circuits arranged in a matrix;

power source voltage source interconnects arranged for said matrix array of pixel circuits;

reference power source interconnects arranged for said matrix array of pixel circuits; and a reference potential;

each said pixel circuit including:

an electro-optic element with a luminance changing according to a flowing current, a drive transistor forming a current supply line between a first terminal and a second terminal and controlling a current flowing through said current supply line in accordance with the potential of a control terminal, a first node, and a first circuit for connecting said first node to said reference power source interconnect for making a potential of said first node change to a fixed potential while said electro-optic element is not emitting light, said current supply line of the drive transistor, said first node, and said electro-optic element being connected in series between said power source voltage source and reference potential, and said power source voltage source interconnects and said reference power source interconnects being laid out in the same direction so as not to have intersecting parts.

6. A display device as set forth in claim 5, further comprising:

data lines arranged for each column of said matrix array of pixel circuits and through which a data signal in accordance with luminance information is supplied and a first control line arranged for each row of said matrix array of pixel circuits;

each said pixel circuit further having:

a second node, a pixel capacitance element connected between said first node and said second node, and a first switch connected between said data line and said second node and controlled in conduction by a corresponding first control line.

7. A display device as set forth in claim 6, wherein:

said device further comprises a second control line;

said drive transistor comprises a field effect transistor with a source connected to said first node, a drain connected to said power source voltage source interconnect or reference potential, and a gate connected to said second node; and said first circuit includes a second switch connected between said first node and fixed potential and controlled in conduction by a corresponding second control line.

8. A display device as set forth in claim 7, wherein when said electro-optic element is driven, as a first stage, said first switch is held in a non-conductive state by a corresponding first control line and, in that state, said second switch is held in a conductive state and said first node is connected to a fixed potential by a corresponding second control line;

as a second stage, said first switch is held in a conductive state by a corresponding first control line, data to be propagated over a corresponding data line is written in said pixel capacitance element, then said first switch is held in a non-conductive state; and as a third stage, said second switch is held in a non-conductive state by a corresponding second control line.

* * * * *